United States Patent
Bala et al.

(10) Patent No.: US 12,531,770 B2
(45) Date of Patent: *Jan. 20, 2026

(54) METHODS, APPARATUS, SYSTEMS, ARCHITECTURES AND INTERFACES FOR CHANNEL STATE INFORMATION REFERENCE SIGNAL FOR NEXT GENERATION WIRELESS COMMUNICATION SYSTEMS

(71) Applicant: InterDigital Patent Holdings, Inc., Wilmington, DE (US)

(72) Inventors: Erdem Bala, East Meadow, NY (US); Moon-il Lee, Melville, NY (US); Afshin Haghighat, Ile-Bizard (CA); Alphan Sahin, Westbury, NY (US); Rui Yang, Greenlawn, NY (US); Frank La Sita, Long Beach, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/135,334

(22) Filed: Apr. 17, 2023

(65) Prior Publication Data
US 2023/0254193 A1      Aug. 10, 2023

Related U.S. Application Data

(63) Continuation of application No. 16/495,253, filed as application No. PCT/US2018/023742 on Mar. 22, 2018, now Pat. No. 11,671,301.

(Continued)

(51) Int. Cl.
*H04L 27/26* (2006.01)
*H04L 5/00* (2006.01)
*H04W 72/044* (2023.01)

(52) U.S. Cl.
CPC ........ *H04L 27/2636* (2013.01); *H04L 5/0007* (2013.01); *H04L 5/0044* (2013.01);
(Continued)

(58) Field of Classification Search
CPC ......... H04L 5/00; H04L 5/001; H04L 5/0048; H04L 5/0051; H04L 27/2602; H04L 27/2621; H04L 27/2666
(Continued)

(56) References Cited

U.S. PATENT DOCUMENTS 8,266,500 B2    9/2012  Kim et al.
2011/0176632 A1  7/2011 Jeong et al.
(Continued)

FOREIGN PATENT DOCUMENTS

CA    2786700 A1    7/2011
CN    101889399 A   11/2010
(Continued)

OTHER PUBLICATIONS

Wang, Yuanquan, et al.,: "Demonstration of 4 × 128-GB/s DFT-S OFDM Signal Transmission over 320-km SMF With IM/DD", IEEE Photonics Journal, vol. 8, No. 2, Apr. 2016, 10 pages.
(Continued)

*Primary Examiner* — Harun Chowdhury
(74) *Attorney, Agent, or Firm* — Jamie T. Nguyen

(57) ABSTRACT

Methods, apparatus, systems, architectures and interfaces for reference signal (RS) configuration, generation, and/or transmission in a transmitter/receiver. The method includes receiving information indicating any of at least first and second modes of operation for transmitting a discrete Fourier transform (DFT)-spread-orthogonal frequency division multiplexing (DFT-s-OFDM) symbol including a reference signal (RS), and transmitting the DFT-s-OFDM symbol including: (1) the RS and data tones, on condition that the
(Continued)

information indicates the first mode; or (2) the RS and null tones, on condition that the information indicates the second mode, wherein the DFT-s-OFDM symbol is divided into a number of segments, each including a chunk of RS tones, and wherein any of a size or a location of the chunk is determined according to any of the first or second modes.

20 Claims, 30 Drawing Sheets

Related U.S. Application Data

(60) Provisional application No. 62/565,912, filed on Sep. 29, 2017, provisional application No. 62/524,252, filed on Jun. 23, 2017, provisional application No. 62/500,921, filed on May 3, 2017, provisional application No. 62/475,221, filed on Mar. 22, 2017.

(52) U.S. Cl.
CPC ........ *H04L 5/0048* (2013.01); *H04L 27/2613* (2013.01); *H04W 72/044* (2013.01)

(58) Field of Classification Search
USPC .......................................... 370/252, 329, 336
See application file for complete search history.

(56) References Cited

U.S. PATENT DOCUMENTS

| | | | |
|---|---|---|---|
| 2012/0039279 A1 | 2/2012 | Chen et al. | |
| 2012/0287828 A1 | 11/2012 | Chen et al. | |
| 2013/0089040 A1 | 4/2013 | Tabet et al. | |
| 2013/0294268 A1 | 11/2013 | Xu et al. | |
| 2014/0043955 A1 | 2/2014 | Ko et al. | |
| 2016/0192385 A1* | 6/2016 | Tooher ................. | H04L 5/0048 370/336 |
| 2018/0091350 A1 | 3/2018 | Akkarakaran et al. | |
| 2018/0206132 A1* | 7/2018 | Guo ...................... | H04W 16/28 |
| 2018/0242327 A1 | 8/2018 | Frenne et al. | |
| 2019/0182777 A1 | 6/2019 | Zhang et al. | |
| 2019/0229971 A1* | 7/2019 | Zhang ................. | H04L 27/2666 |
| 2019/0334751 A1 | 10/2019 | Liu et al. | |
| 2020/0052944 A1 | 2/2020 | Zhang et al. | |
| 2020/0059398 A1 | 2/2020 | Pan et al. | |
| 2020/0076647 A1 | 3/2020 | Zhang et al. | |
| 2020/0196332 A1 | 6/2020 | Yokomakura et al. | |

FOREIGN PATENT DOCUMENTS

| | | |
|---|---|---|
| CN | 104956611 A | 9/2015 |
| CN | 103222221 B | 7/2016 |
| JP | 2013516888 A | 5/2013 |
| JP | 2015144455 A | 8/2015 |
| JP | 2015523761 A | 8/2015 |
| JP | 2016514406 A | 5/2016 |
| KR | 20190002426 A | 1/2019 |
| KR | 10-2020-009913 | 8/2020 |
| WO | WO 2009150177 A2 | 12/2009 |
| WO | WO 2010048129 A1 | 4/2010 |
| WO | WO 2010058943 A2 | 5/2010 |
| WO | WO 2011032035 A2 | 3/2011 |
| WO | WO 2014014743 A1 | 1/2014 |
| WO | WO 2017026972 A1 | 2/2017 |

OTHER PUBLICATIONS

International Search Report and Written Opinion, International Patent Application PCT/2018/023742, Aug. 22, 2018, 20 pages.

"Phase and frequency tracking reference signal considerations", 3GPP Tdoc R1-1702617, 3GPP TSG-RAN WG1 #88, Athens, Greece, Feb. 13-17, 2017, 7 pages.

Intel Corp, "Reference Signal and Procedure for UL Beam Management", 3GPP Tdoc R1-1700348, 3GPP TSG RAN WG1 NR Ad-Hoc Meeting, Spokane, USA, Jan. 16-20, 2017, 4 pages.

* cited by examiner

METHODS, APPARATUS, SYSTEMS, ARCHITECTURES AND INTERFACES FOR CHANNEL STATE INFORMATION REFERENCE SIGNAL FOR NEXT GENERATION WIRELESS COMMUNICATION SYSTEMS

CROSS REFERENCE TO RELATED APPLICATIONS

This application is a Continuation of U.S. patent application Ser. No. 16/495,253 filed Sep. 18, 2019 which is a National Stage Application filed under 35 U.S.C. 371 of International Application No. PCT/US18/023742, filed Mar. 22, 2018 and claims the benefit of U.S. Provisional Application No. 62/475,221, filed Mar. 22, 2017, U.S. Provisional Application No. 62/500,921, filed May 3, 2017, U.S. Provisional Application No. 62/524,252, filed Jun. 23, 2017, and U.S. Provisional Application No. 62/565,912, filed Sep. 29, 2017, the contents of each of which are incorporated by reference herein.

BACKGROUND

The present invention relates to the field of communications and, more particularly, to methods, apparatus, systems, architectures and interfaces for communications in an advanced or next generation wireless communication system, including communications carried out using a new radio and/or new radio access technology and involve transmission of reference signals used for determining channel state information.

The design of the next generation of wireless systems is currently underway in the academia, industry, regulatory and standardization bodies. The IMT-2020 Vision sets the framework and overall objectives for the development of the next generation of wireless systems. To address an anticipated increase in wireless data traffic, demand for higher data rates, low latency and massive connectivity, the IMT-2020 Vision defines the main use cases that drive fifth generation (5G) design requirements: enhanced mobile broadband (eMBB), ultra-reliable low latency communications (URLLC), and massive machine type communications (mMTC). These use cases have widely different targets on peak data rates, latency, spectrum efficiency, and mobility.

Although the IMT-2020 Vision indicates not all of the key capabilities are equally important for a given use case, it is important to build flexibility in the 5G designs, to enable meeting expected use-case specific requirements and support multiple services. The air interface, specifically the physical (PHY) layer waveform, is one of a number of key components for new 5G technology. In this regard, 3GPP is conducting research and development for a new radio and/or new radio access technology (collectively referred to as "NR") for the advanced or next generation (e.g., 5G) wireless communication system in consideration of the main use cases and a variety of other/different applications along with their various needs and deployment scenarios and attendant (e.g., mandated specific) performance requirements thereof.

SUMMARY

Methods, apparatuses, and systems for reference signal configuration, generation, and/or transmission implemented in a transmitter/receiver are provided. A representative method includes receiving information indicating any of at least first and second modes of operation for transmitting a discrete Fourier transform (DFT)-spread-orthogonal frequency division multiplexing (DFT-s-OFDM) symbol including a reference signal (RS); and transmitting the DFT-s-OFDM symbol including: (1) the RS and data tones, on condition that the information indicates the first mode; or (2) the RS and null tones, on condition that the information indicates the second mode, wherein the DFT-s-OFDM symbol is divided into a number of segments, each including a chunk of RS tones, and wherein any of a size or a location of the chunk is determined according to any of the first or second modes.

A representative device has circuitry, including any of a processor, memory, a receiver, and a transmitter, configured to receive information indicating any of at least first and second modes of operation for transmitting a discrete Fourier transform (DFT)-spread-orthogonal frequency division multiplexing (DFT-s-OFDM) symbol including a reference signal (RS); and transmit the DFT-s-OFDM symbol including: (1) the RS and data tones, on condition that the information indicates the first mode; or (2) the RS and null tones, on condition that the information indicates the second mode, wherein the DFT-s-OFDM symbol is divided into a number of segments, each including a chunk of RS tones, and wherein any of a size or a location of the chunk is determined according to any of the first or second modes.

A representative method includes precoding, at a discrete Fourier transform (DFT) unit, a reference signal sequence padded with zeros to generate frequency domain samples; mapping, at a subcarrier mapping unit, (i) the frequency domain samples to a subset of equally spaced subcarriers of a set of available subcarriers, and (ii) null signals to remaining subcarriers of the set of available subcarriers, wherein the reference signal sequence includes reference signal tones and any of data tones or null tones, wherein the reference signal sequence is divided into a number of segments, and wherein each segment includes a chunk of reference signal tones; feeding the frequency domain samples and the null signals to an inverse discrete Fourier transform (IDFT) unit in accordance with the mapping; and transforming the frequency domain samples and the null signals received by the IDFT unit into a block based signal using an IDFT, wherein the block based signal includes a plurality of repetitions of the reference signal sequence for transmission during a single subframe, and wherein each repetition includes the padded zeros as a cyclic prefix.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
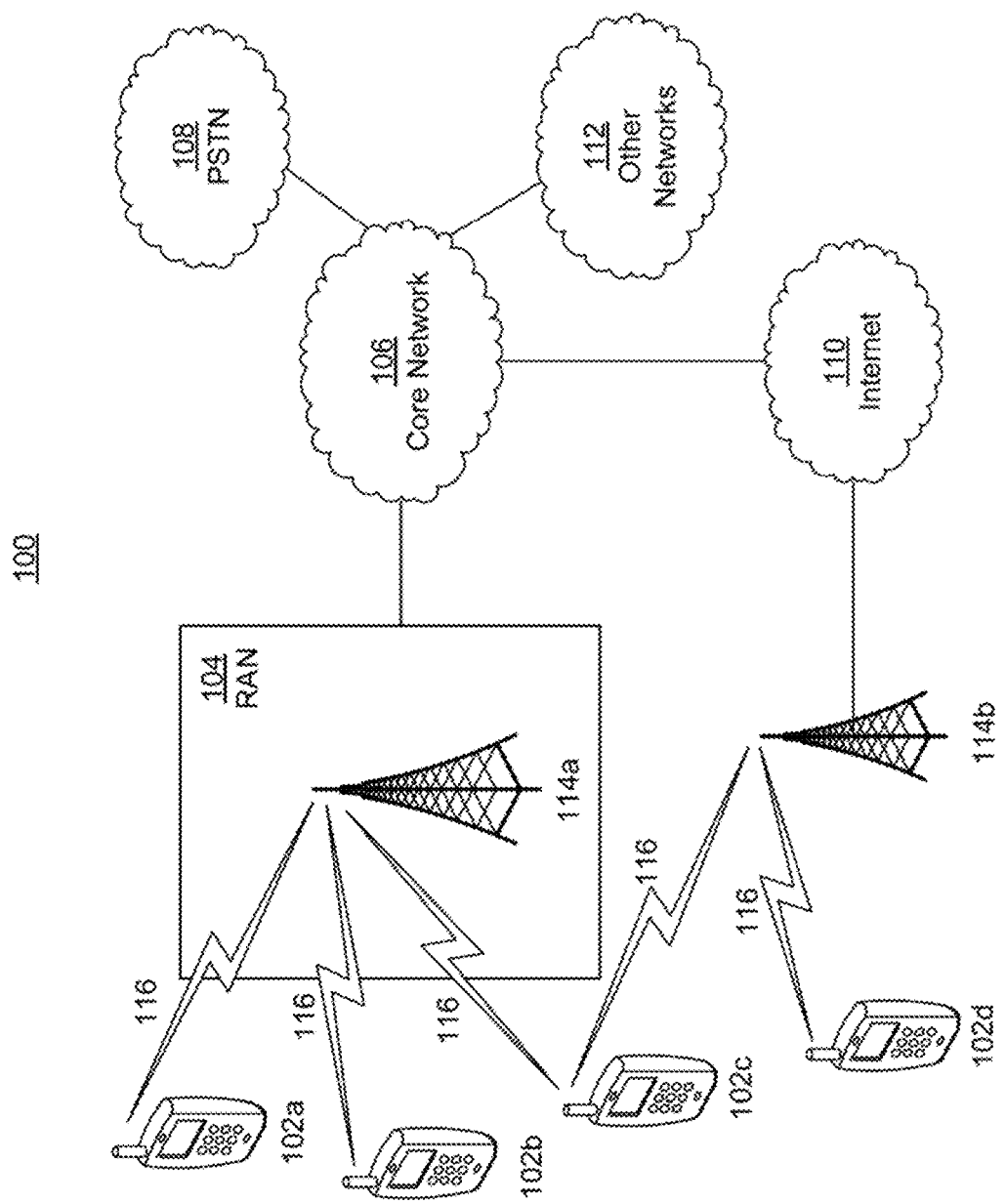
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive units (WTRUs) 102a, 102b, 102c, 102d, a radio access network (RAN) 104, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and 102d is interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology.

Figure 2:
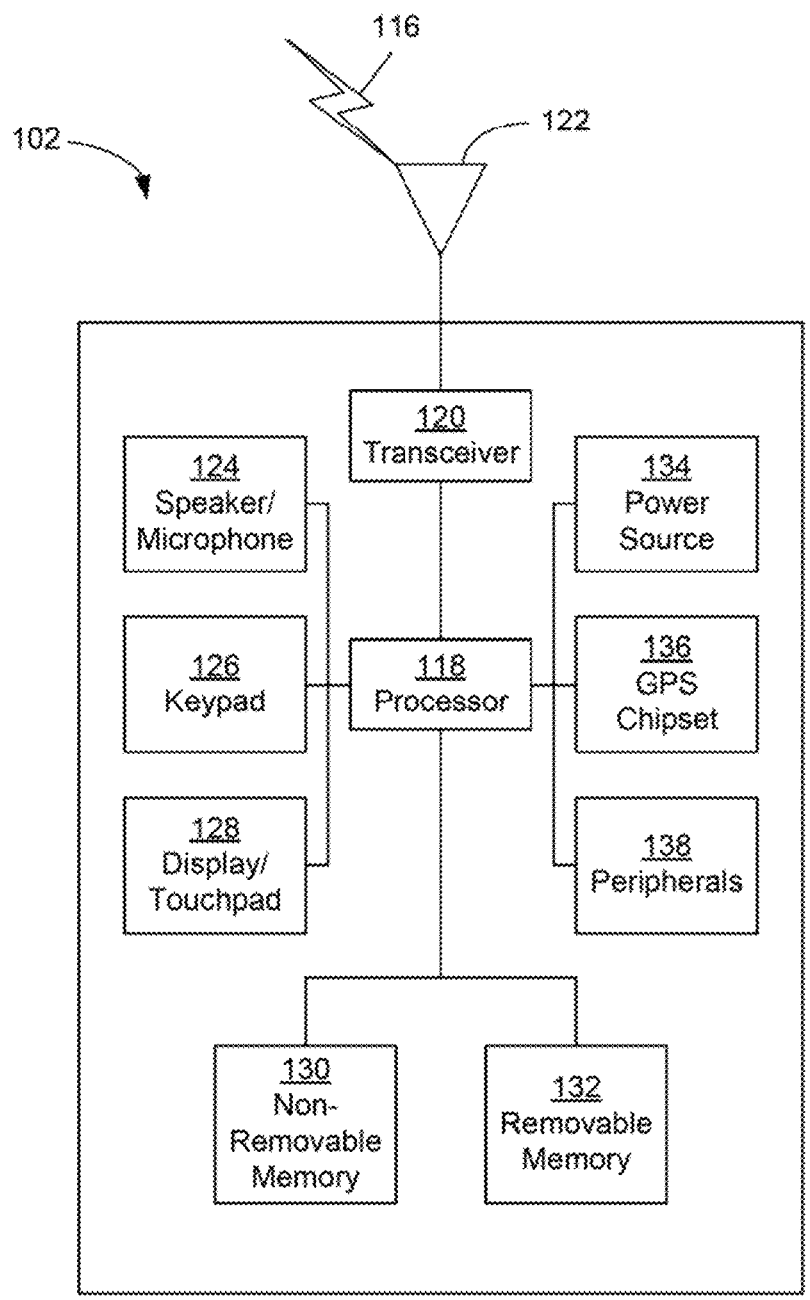
FIG. 2 is a system diagram illustrating an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 3:
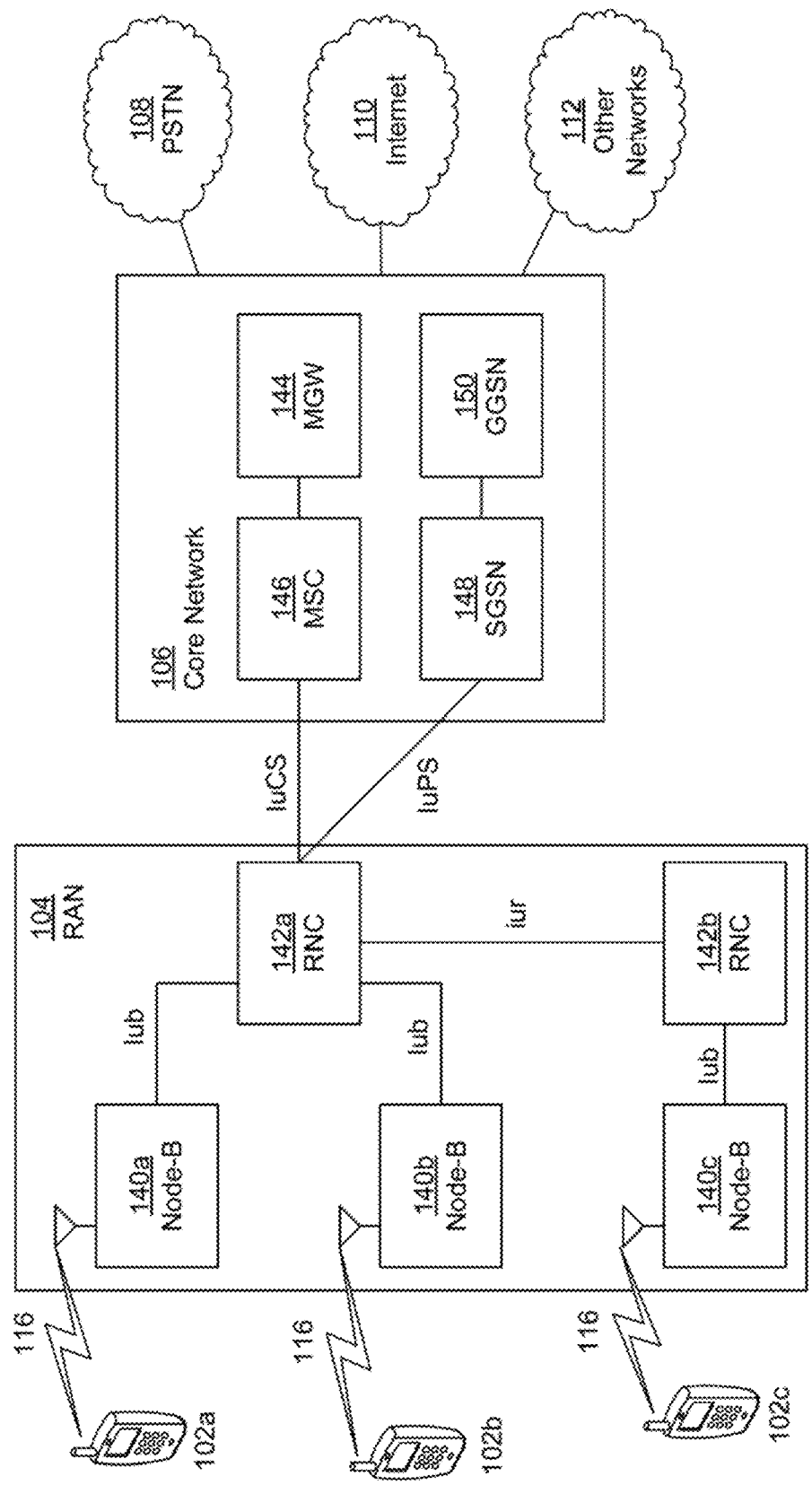
FIG. 3 is a system diagram illustrating an example radio access network and another example core network that may be used within the communications system illustrated in FIG. 1.

FIG. 3 is a system diagram illustrating the RAN 103 and the core network 106 according to another embodiment. As noted above, the RAN 103 may employ a UTRA radio technology to communicate with the WTRUs 102a, 102b, and 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the other networks 112, which may include other wired and/or wireless networks that are owned and/or operated by other service providers.

Figure 4:
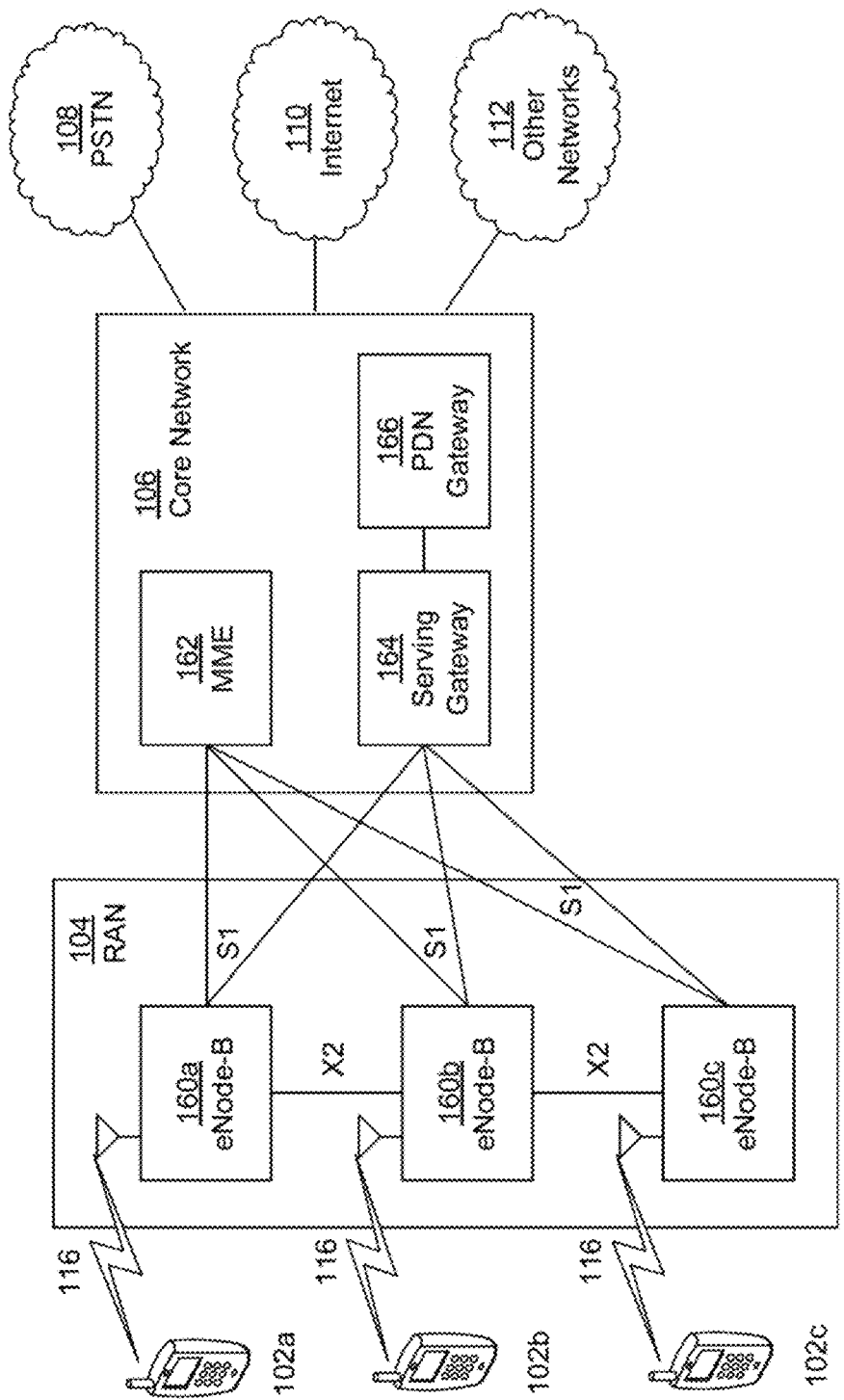
FIG. 4 is a system diagram illustrating another example radio access network and another example core network that may be used within the communications system illustrated in FIG. 1.

FIG. 4 is a system diagram illustrating the RAN 104 and the core network 107 according to embodiments. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 4, the eNode-Bs 160*a*, 160*b*, 160*c* may communicate with one another over an X2 interface.

The core network 107 shown in FIG. 4 may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The serving gateway 164 may be connected to each of the eNode Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The serving gateway 164 may be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the other networks 112, which may include other wired and/or wireless networks that are owned and/or operated by other service providers.

Figure 5:
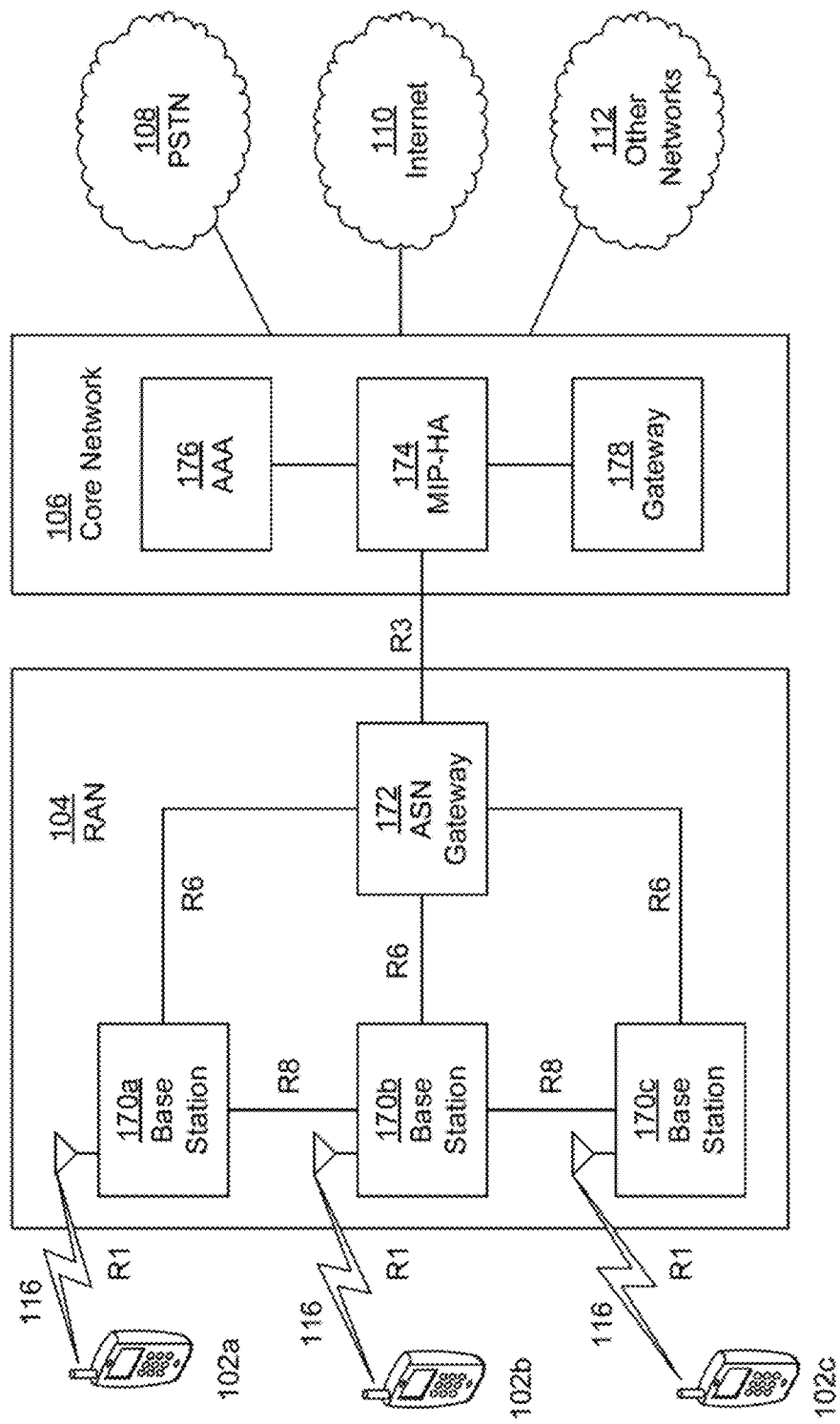
FIG. 5 is a system diagram illustrating a further example radio access network and a further example core network that may be used within the communications system illustrated in FIG. 1.

FIG. 5 is a system diagram illustrating the RAN 105 and the core network 109 according to embodiments. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 5, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. The base station 180*a*, for example, may use multiple antennas to transmit wireless signals to, and/or receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102a, 102b, 100c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANS (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 6:
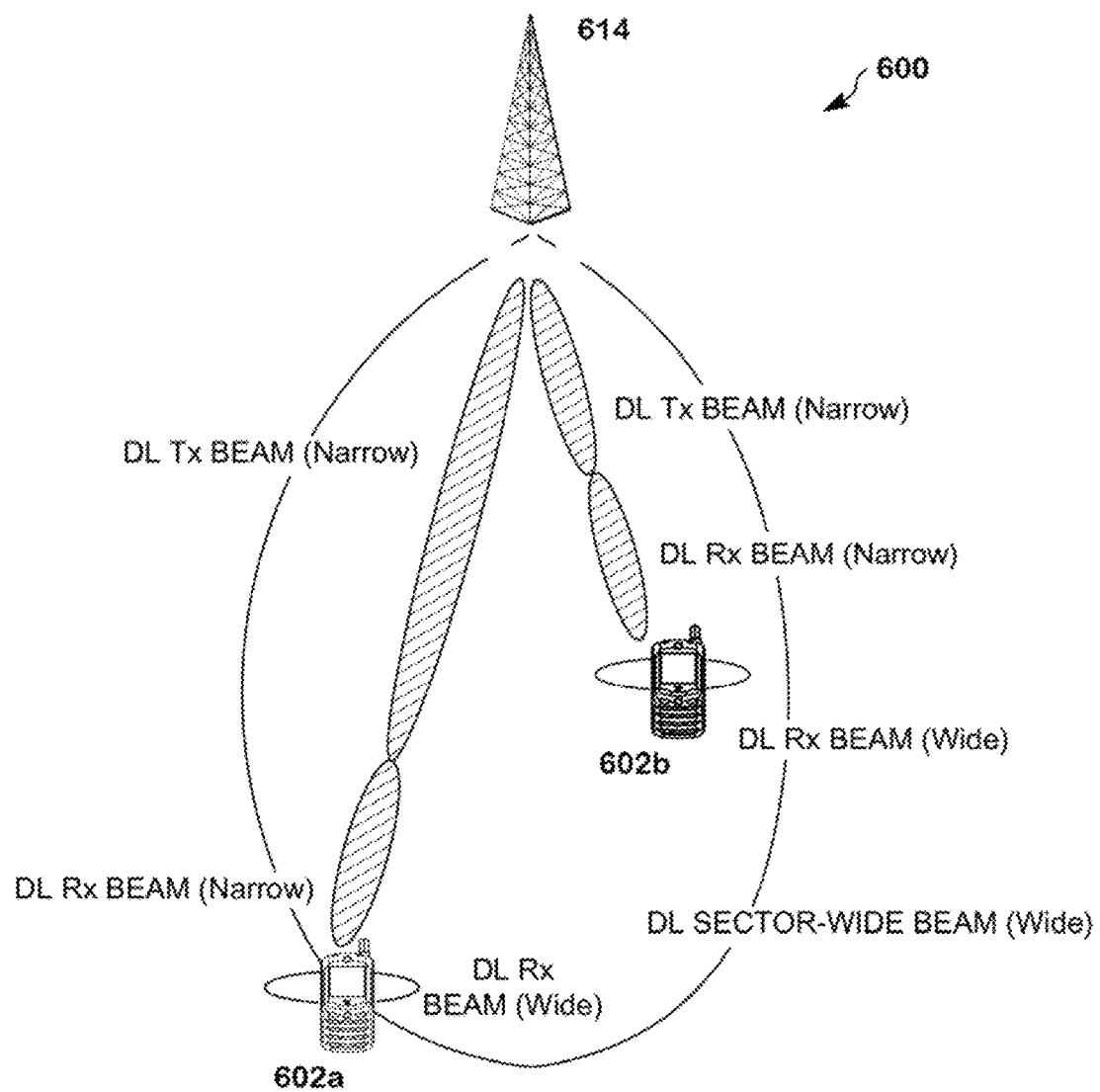
FIG. 6 illustrates an example communications system according to embodiments.

FIG. 6 illustrates an example communications system 600 in which embodiments may be practiced or implemented. The communications system 600 is provided for the purpose of illustration only and is not limiting of disclosed embodiments. As shown in FIG. 6, the communications system 600 includes a base station 614 and WTRUs 602a, 602b. As would be understood by a person of skill in the art, the communications system 600 may include additional elements not shown in FIG. 6.

The base station 614 may be any of the base stations 114 (FIG. 1), Node-Bs 140 (FIG. 3), eNode-Bs 160 (FIG. 4) and base stations 170 (FIG. 5), for example. The base station 614 may include functionality similar to, and/or different from, the base stations 114, Node-Bs 140, eNode-Bs 160 and base stations 170, as well. For example, the base station 614 may include functionality to support features of 5G and to implement the procedures, techniques, etc. included herein.

The base station 614 may be configured for small cell operation and/or deployment. The base station 614 may be configured to support any of centimeter wave (cmW) and millimeter wave (mmW) operation. For simplicity of exposition, the term "xmW" may be used herein to refer to any of cmW and mmW. The base station 614 may be additionally and/or alternatively configured to support various (e.g., all or some) functionality and/or features for small cell operation and/or deployment as specified in 3GPP Release 12. In this regard, the base station 614 may be capable of operating an xmW air interface in parallel, simultaneously and/or otherwise in connection with an LTE, LTE-A or like-type (collectively "LTE") air interface. The base station 614 may be equipped with at least one of various advanced antenna configurations and beamforming techniques, such as those that may allow the base station 614 to simultaneously transmit LTE or other downlink channels in a wide beam pattern and xmW channels in one or more narrow beam patterns. The base station 614 may also be configured to utilize an LTE or other uplink configuration adapted with features and procedures (e.g., those detailed herein) to support WTRUs that lack, or do not use their, xmW uplink transmission capabilities.

Each of the WTRUs 602a, 602b may be any of the WTRUs 102 (FIGS. 1-5), for example. Each of the WTRUs 602a, 602b may include functionality similar to, and/or different from, the WTRUs 102, as well. The WTRUs 602a, 602b may include functionality to support features of 5G and to implement the procedures, techniques, etc. included herein. For simplicity of exposition, when "WTRU 604" is used herein, it may refer to any of the WTRUs 602a, 602b.

Each of the WTRUs 602a, 602b may be configured to support xmW operation. The WTRUs 602a, 602b may be further configured to support various (e.g., all or some) functionality and/or features for user equipment operation and/or deployment as specified in 3GPP Release 12. Each of the WTRUs 602a, 602b may be capable of operating LTE/other and xmW air interfaces in parallel, simultaneously and/or otherwise in connection with each other. Each of the WTRUs 602a, 602b may have two sets of antennas and accompanying RF chains; one configured for operating in a LTE band and the other configured for operating in a xmW frequency band. However, the present disclosure is not limited thereto, and a WTRU may have any number of sets of antennas and accompanying RF chains. Each of the WTRUs 602a, 602b may include one or more baseband processors, and the baseband processors may include separate, or at least partially combined, functionality for baseband processing of the LTE frequency band and the xmW frequency band. The baseband processing functions may share hardware blocks for the xmW and LTE air interfaces, for example.

Although the WTRU is described in FIGS. 1-5 as a wireless terminal, it is contemplated that in certain representative embodiments such a terminal may use (e.g., temporarily or permanently) wired communication interfaces with the communication network.

Reference signals included in a transmission from a transmitter of one node may be used by a receiver of another node to measure and/or determine a channel state of a channel between the transmitter and the receiver. The channel state may be used to determine a modulation and coding scheme (e.g., order) of the transmission, precoding matrices to be used in multiple antenna transmission, and other channel information. Examples of such reference signals include channel state information (CSI) reference signals (CSI-RS) and sounding reference signals (SRS) used in LTE communication systems for determining downlink (DL) channel state and uplink (UL) channel state, respectively.

The reference signals may also be used to facilitate selection of transmit beams by a transmitter and/or selection of receive beams by a receiver for directional communications. The transmitter and receiver may transmit and receive (e.g., OFDM) symbols on different (spatially swept) analog beams to find a best pair of transmit/receive beams.

In current LTE communication systems, the reference signals (i.e., CSI-RS and/or SRS) used to evaluate the quality of a pair of beams for beam training are disposed in one (i.e., a single) OFDM symbol per beam. An undesirable consequence of this is, as the number of beams to be swept increases, the overhead associated with reference signal (i.e., CSI-RS and/or SRS) transmissions for beam training may increase significantly because of the one-for-one relationship between the number OFDM symbols needing to be evaluated and the number of beams being swept. A further undesirable consequence of the one-for-one relationship between the number OFDM symbols needing to be evaluated and the number of beams being swept is that only a single beam can be tested per OFDM symbol duration.

Figure 7:
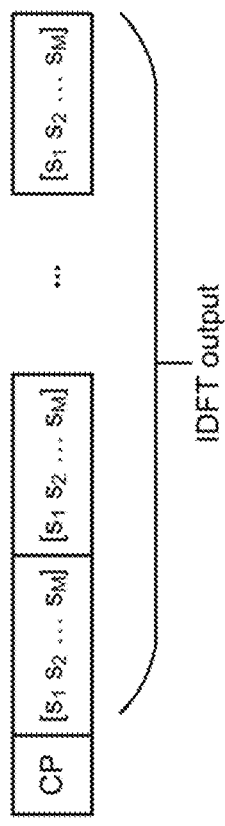
FIG. 7 is a diagram illustrating sub-symbols of an orthogonal frequency division multiplexing (OFDM) symbol according to embodiments.

FIG. 7 is a diagram illustrating sub-symbols of an orthogonal frequency division multiplexing (OFDM) symbol according to embodiments. Pursuant to the representative procedures and technologies provided herein, the overhead associated with reference signal transmissions for beam training on a per beam basis may be reduced as compared to the current LTE communications systems. Also pursuant to the representative procedures and technologies provided herein, more than a single beam may be evaluated per OFDM symbol duration (or other like-type amount of time (e.g., a baseline data transmission)). In one or more representative embodiments, reference signal symbols may first be mapped to corresponding subcarriers and a time domain signal may be generated with an inverse discrete Fourier transform (IDFT) operation, creating an OFDM or OFDM variant signal. The OFDM or OFDM variant signal may be precoded with a beamforming vector (e.g., per antenna port) in an analog domain. Further, a digital precoding matrix may be applied to a baseband signal if multiple data streams are to be transmitted. The receiver may also apply a receive beamforming vector to the received signal (e.g., per antenna port) in the analog domain.

The terms CSI-RS, SRS, beam reference signal, beam measurement reference signal, beam management reference signal, and or any other similar and/or suitable signal may be referred to herein interchangeably. Also, methods, apparatuses, systems, architectures, and interfaces described herein for downlink are equally applicable for uplink. According to embodiments, a subcarrier mapping unit may map the output of the DFT block to the inputs of the IDFT block.

FIG. 7 is a diagram illustrating sub-symbols in an OFDM symbol according to embodiments. According to embodiments, beam training overhead may be reduced by using an OFDM symbol that includes repeating sub-symbols as illustrated in FIG. 7. According to embodiments, in a case where an OFDM symbol including repeating sub-symbols is generated, beam training may be performed per sub-symbol. For example, a (e.g., each) sub-symbol may be precoded according to different beams (e.g., may be precoded differently at a transmitter antenna port and/or at a receiver antenna port) in order to reduce overhead for any of a CSI-RS or a SRS transmission. According to embodiments, an antenna port may be configured for one or more antenna elements and may be viewed as one logical entity.

According to embodiments, a WTRU may perform a measurement (e.g., beam measurement) for each sub-symbol. For example a WTRU may perform a beam measurement associated with any of a transmit beam index or a receive beam index for each sub-symbol. According to embodiments, a WTRU may be configured (e.g., pre-configured, determined, indicated, notified, etc.) to use a set of transmit beams (e.g., indicated by transmit beam indices) and/or a set of receive beams (e.g., indicted by receive beam indices). According to embodiments, the WTRU may perform a measurement (e.g., a beam measurement) for any of a TX beam included in a set of transmit beams and a receive beam included in a set of receive beams.

According to embodiments, in a case where one or more sub-symbols are used, a WTRU may associate a (e.g., each) sub-symbol with a transmit beam (e.g., transmit beam index). For example, a WTRU may assume that each sub-symbol may be associated with a transmit beam according to its transmit beam index. According to embodiments, one or more (e.g., all) sub-symbols of an OFDM symbol may be associated with a single transmit beam. According to embodiments, one or more (e.g., each, every) sub-symbol in an OFDM symbol may be associated with a respective transmit beam.

According to embodiments, a WTRU may transmit an UL signal (e.g., a SRS, a beam reference signal, etc.) using a transmit beam in each sub-symbol of an OFDM symbol and/or a discrete Fourier transform (DFT) spread OFDM (DFT-s-OFDM) symbol. For example, a WTRU may transmit a CRS-RS according to associating each sub-symbol of an OFDM symbol to a respective transmit beam index. According to embodiments, one or more sub-symbols may be used within an OFDM symbol and/or DFT-s-OFDM symbol. According to embodiments, a pair including a transmit beam (e.g., a transmit beam index) and a receive beam (e.g., a receive beam index) may be referred to as a beam-pair link (BPL). According to embodiments, a BPL may be interchangeably referred to as a beam-pair, transmit-receive beam association, and linked transmit and receive beam.

According to embodiments, one or more (e.g., all, each) sub-symbols of an OFDM symbol may be associated with a same transmit beam. According to embodiments, a WTRU may perform a beam measurement and/or beam reference signal transmission respectively associated with each sub-symbol with different BPLs. According to embodiments, the different BPLs may have the same transmit beam, and, in such a case, a different receive beam may be used across sub-symbols. According to embodiments, a sub-symbol, a sub-time unit, a partial symbol, a partial OFDM symbol, and a sub-OFDM symbol may be interchangeably referred to herein; and further, OFDM and DFT-s-OFDM may be interchangeably referred to herein. According to embodiments, a WTRU may be configured (e.g., signaled, indicated, informed, etc.) with information indicating any of (1) a (e.g., certain) number of sub-symbols per (e.g., in an) OFDM symbol and (2) a number of OFDM symbols used for beam measurements and/or beam reference signal transmission (e.g., SRS transmission).

According to embodiments, the number of OFDM symbols used for beam measurements may be determined as a function of any of: (1) a number of transmit beams, (a) a number of receive beams, or (3) number of sub-symbols. According to embodiments, the OFDM symbols used for beam measurements may be consecutive in a time. According to embodiments, a subset of slots, subframes, and/or radio frames may be used, indicated, and/or configured for beam measurement in a manner associated with the sub-symbols.

According to embodiments, the number of sub-symbols of (e.g., included in) an OFDM symbol may be determined based on the transmit beams used in the sub-symbols of a same OFDM symbol. For example, according to embodiments, a first number of sub-symbols of an OFDM symbol may be used, determined, or selected if a same transmit beam is used for all sub-symbols in the OFDM symbol. According to embodiments, a second number of sub-symbols for an OFDM symbol may be used, determined, or selected if a different or more than one transmit beam is used across sub-symbols in an OFDM symbol. According to embodiments, the second number of sub-symbols may be determined according to a function of the first number of sub-symbols. For example, the first number of sub-symbols (e.g., with a predefined offset) may be used to determine the second number of sub-symbols According to embodiments, a transmit beam index for each sub-symbol may be indicated (e.g., to a WTRU by a network). According to embodiments, a WTRU may be configured with information indicating a set of transmit beams (e.g., beam group) for beam reference signal transmission across sub-symbols. According to embodiments, an associated downlink control information (DCI) may indicate a set of transmit beams associated with a beam reference signal for the sub-symbols, for example, when aperiodic beam reference signal is triggered. According to embodiments, a WTRU may indicate transmit beam index for each sub-symbol using any of: (1) select a sequence within a predefined set of sequences for each sub-symbol, autonomously determine a transmit beam index, and send its associated sequence to indicate the determined transmit beam index; or (2) transmit a modulated data symbol in each sub-symbol, wherein the modulated data symbol may include a transmit beam index.

According to embodiments, a WTRU may indicate and/or report capability information indicating a number of sub-symbols. According to embodiments, such capability information may indicate a maximum number of sub-symbols in an OFDM symbol. According to embodiments, a maximum number of sub-symbols may vary according to a number of transmit beams used for sub-symbols. For example, the maximum number of sub-symbols may be different in a case where a same transmit beam is used across sub-symbols than when different transmit beams are used across sub-symbols. According to embodiments, a maximum number of sub-symbols in an OFDM symbol may be determined based on OFDM symbol length (e.g., subcarrier spacing).

According to embodiments, a number of sub-symbols in an OFDM-symbol may be determined based on any of: (1) a higher layer configuration (e.g., a RRC signal, message, broadcast, etc.); (2) a dynamic indication (e.g., in DCI); (3) numerology (e.g., subcarrier spacing) of the OFDM symbol; (4) UL and/or DL; and (5) frequency band. According to embodiments, as used herein, the term "OFDM symbol" may refer to a multicarrier waveform that may also include, among others, any of DFT-s-OFDM, zero tail (ZT) DFT-s-OFDM, etc.

Sub-Unit CSI-RS Generation with IDFT

A property of a DFT operation (referred to herein as property 1) used in the embodiments presented herein is presented below. According to embodiments, let N be an IDFT size and let X(k) be defined as a frequency domain signal with k as the subcarrier index. Assume Z(k) is an upsampled version of X(k) where L is the upsampling ratio. In such a case, according to embodiments, we can define Equation 1 as:

$$Z(k) = \begin{cases} X(m), \text{ for } k = mL, m = 0, 1, \ldots \left(\frac{N}{L}\right) - 1 \\ 0, \text{ otherwise} \end{cases} \quad \text{Equation 1}$$

According to embodiments, time domain signals z(n) and x(n) (the IDFT output z(n) and x(n)) may be written, where n is the time index, as shown in Equations 2 and 3.

$$z(n) = \sum_{k=0}^{N-1} Z(k)\exp\left(\frac{j2\pi kn}{M}\right) = \sum_{m=0}^{(\frac{N}{L})-1} X(m)\exp\left(\frac{j2\pi mLn}{N}\right), \quad \text{Equation 2}$$
$$n = 0, 1, \ldots N$$

$$x(n) = \sum_{m=0}^{(\frac{N}{L})-1} X(m)\exp\left(\frac{j2\pi mLn}{N}\right), n = 0, 1, \ldots \left(\frac{N}{L}\right) - 1 \quad \text{Equation 3}$$

According to embodiments, from Equations 2 and 3, Equation 4 may be expressed as:

$$z(n + N/L) = \sum_{m=0}^{(\frac{N}{L})-1} X(m)\exp\left(\frac{j2\pi mL\left(n + \frac{N}{L}\right)}{N}\right) = x(n) \quad \text{Equation 4}$$

According to embodiments, as shown in Equation 4, z(n) is equal to x(n) repeated by L times. According to embodiments, if the DFT of x(n) is mapped to a uniformly interleaved set of inputs (e.g., subcarriers) of an IDFT block, the resulting signal may be a number L repetitions of x(n).

Figure 8:
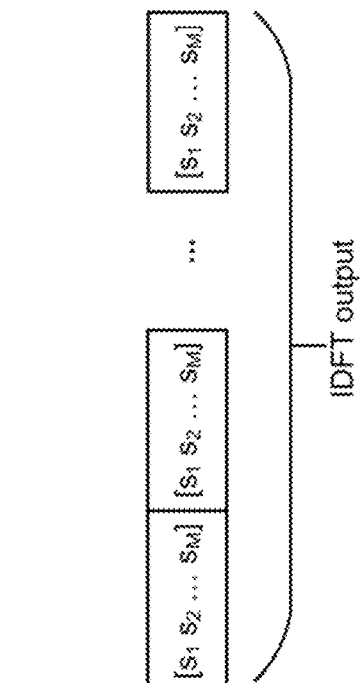
FIG. 8 is a diagram illustrating a DFT precoded IDFT CSI-RS generator of a transmitter according to embodiments.
Figure 8:
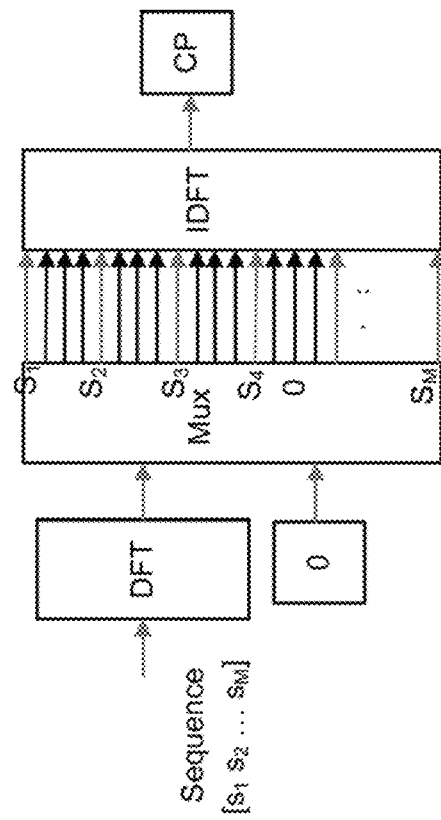

FIG. 8 is a diagram illustrating a DFT precoded IDFT CSI-RS generator of a transmitter according to embodiments. The transmitter may employ a block or block-based (collectively "block-based") waveform in accordance with an air interface of the communication system. As an example, for DL transmissions, an orthogonal frequency division multiplexing (OFDM) with cyclic prefixing (CP-OFDM) waveform may be used. For UL transmissions, a single carrier (SC) frequency division multiplexing (FDM) (SC-FDM) adapted for multiple access (SC-FDMA) and with cyclic prefixing (CP-SC-FDMA or simply "SC-FDMA") waveform is used. Because of the way the SC-FDMA waveform is generated in practice, it is commonly referred to DFT-s-OFDM waveform. Accordingly, the term "DFT-s-OFDM" and the term "SC-FDMA" may be used interchangeably herein.

Akin to a DFT-s-OFDM waveform generator, a DFT precoded IDFT CSI-RS generator may generate DFT precoded reference signal on a block-by-block basis, where, for each block (set) of reference signals ("reference-signal block") processed through the DFT precoded IDFT CSI-RS generator, a corresponding DFT precoded reference signal results. The DFT precoded IDFT CSI-RS generator may include a DFT unit, a subcarrier mapping unit and an inverse DFT (IDFT) unit.

In operation, a reference-signal block is fed to the DFT unit. The DFT unit transforms the reference signals to frequency domain samples using a DFT, and feeds the frequency domain samples to the subcarrier mapping unit. The subcarrier mapping unit maps the received frequency domain samples interleaved with zeros (e.g., padded with zeros) to a set of available subcarriers, that is, an available-subcarrier set that corresponds to a respective set of inputs of the IDFT unit. The subcarrier mapping unit feeds the mapped frequency domain samples and interleaved zeros to the appropriate inputs of the IDFT unit. The IDFT unit transforms the mapped frequency domain samples and interleaved zeros (which may be referred to as padded zeros)

using an IDFT into a DFT precoded reference signal in which the reference signals are spread across the subcarriers of the available-subcarrier set. After the DFT precoded reference signal along with the rest of the OFDM or OFDM variant symbol is generated, cyclic prefixing may be carried out (e.g., prefixing a CP to the OFDM or OFDM variant symbol) to complete generation of a OFDM or OFDM variant block that includes the reference signals fed to the DFT unit. Although the CP is discarded by a receiver of the OFDM or OFDM variant block, the CP aids in mitigating inter-symbol interference (ISI) and allows one-tap frequency domain equalization (FDE) at a receiver.

In accordance with above, the CSI-RS illustrated in FIG. 8 may be generated using Property 1 (e.g., as expressed in Equation 4). According to embodiments, a sequence may (e.g., first be) precoded with a DFT matrix. For example, the DFT matrix may be applied by a DFT block 701 to the sequence in order to precode the sequence. According to embodiments, an output of the DFT block 701 may be mapped to a set of inputs of an IDFT block 702, for example, such that the set of inputs correspond to a uniformly interleaved set of subcarriers. According to embodiments, in a case where the IDFT size is 24 and the DFT size is 6, then the DFT output may be mapped to any of: (1) subcarriers 0, 4, 8, 12, 16, and 20 if the indices for the subcarriers are assumed to be from 0 to N–1, where N is the IDFT size; and (2) subcarriers –12, –8, –4, 0, 4, 8 if the indices for the subcarriers are assumed to be from –N/2 to N/2–1 where N is the IDFT size. According to embodiments, the remaining subcarriers may be loaded with zeros.

According to embodiments, a ratio, L, of the IDFT to the DFT size may determine a number of repetitions of a sequence in the DFT precoded reference signal (e.g., the signal output from the IDFT block 702). For example, in the case described above, wherein L=N/M=4, the output signal has 4 repetitions of a sequence. According to embodiments, each of these repetitions may be referred to as a sub-time unit (e.g., a sub-symbol). According to embodiments, a transmitter may transmit (e.g., each of these) sub-time units with different (e.g., respective) analog beams, for example, because analog beamforming may be performed in time domain. According to embodiments, a receiver may receive (e.g., each of these) sub-time units via a different (e.g., respective) beam.

Figure 9:
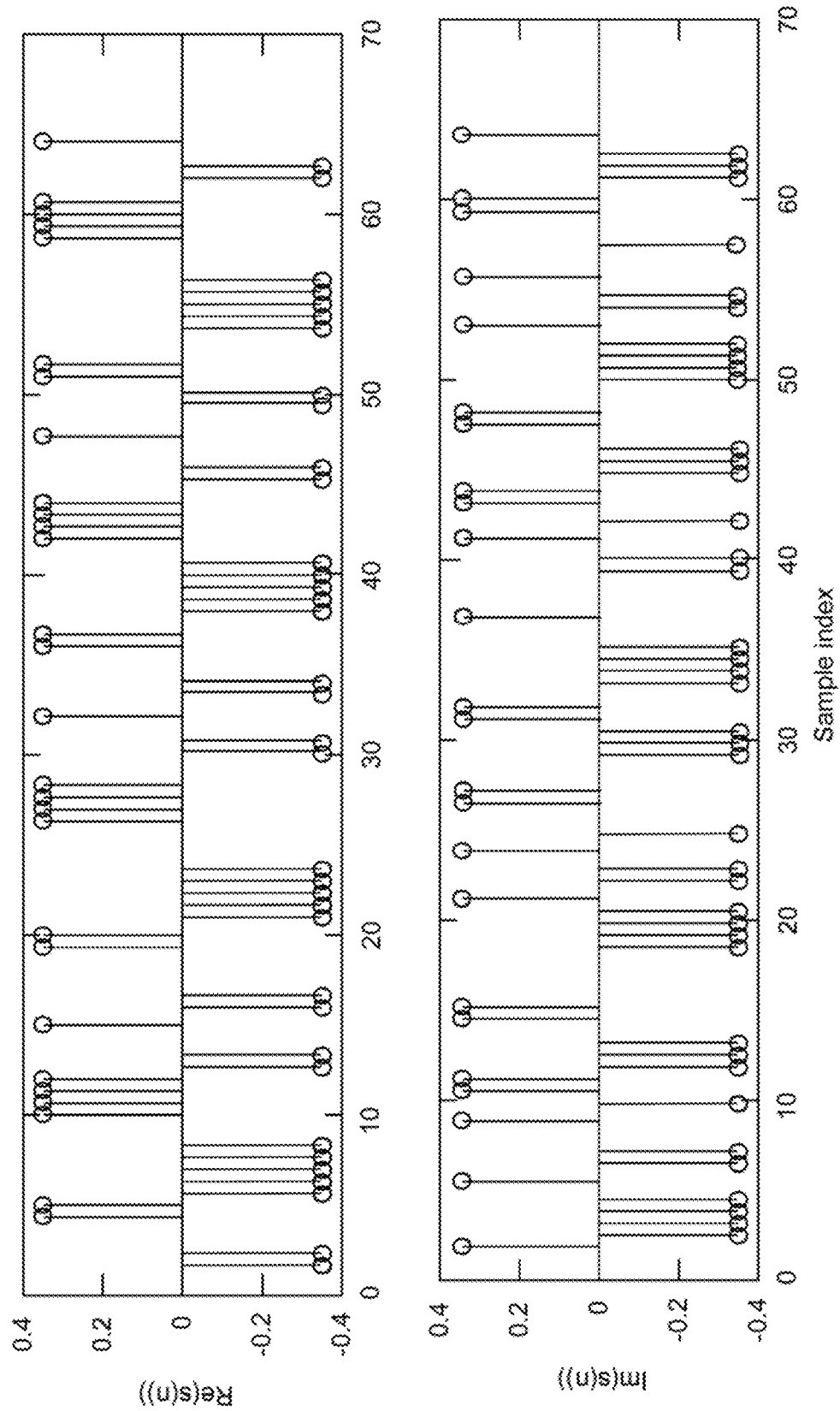
FIG. 9 is a diagram illustrating a signal according to embodiments.

FIG. 9 is a diagram illustrating a signal according to embodiments.

According to embodiments, in a case illustrated in FIG. 9, for the signal at the output of the IDFT, the DFT and IDFT sizes were chosen as 16 and 64, respectively, and the input signal to the DFT may be a randomly generated QPSK modulated signal.

According to embodiments, a CSI-RS and/or SRS may be transmitted in a subset of subcarriers of an OFDM-symbol. According to embodiments, the subset of subcarriers may be distributed uniformly over a (e.g., certain) frequency bandwidth, such as a frequency bandwidth associated with the OFDM symbol. According to embodiments, the (e.g., certain) frequency bandwidth may be for a system (e.g., a system bandwidth) or the frequency bandwidth may be for one or more UEs. According to embodiments, the subset of subcarriers may be disposed to have (e.g., located with) uniform spacing over the (e.g., certain) frequency bandwidth. According to embodiments, a location of a first subcarrier of the subset may be determined and the subsequent subcarriers of the subset may be disposed (e.g., located) at every N subcarriers. The subset of subcarriers which may be distributed uniformly over a certain frequency bandwidth may be referred to as interleaved frequency division multiple access (IFDMA) (see FIG. 8). According to embodiments, in the case of IFDMA, a sequence $[s_1 \, s_2 \ldots s_M]$ may be the CSI-RS sequence transmitted in the subset of subcarriers in an IFDMA manner. According to embodiments, a location of the first subcarrier of the subset may be determined according to a frequency offset. The frequency offset may be referred to herein as any of a CSI-RS reuse pattern, a reuse pattern, a comb index, a comb number, etc.

According to embodiments, the subset of subcarriers may be located in the set of subcarriers in the same frequency locations (e.g., a subband), and in such a case, the subset of subcarriers may be consecutive in the frequency domain. According to embodiments, a CSI-RS sequence $[s_1 \, s_2 \ldots s_M]$ may be generated by performing a DFT of input sequence, which may be referred to as a DFT input sequence, DFT input tones, and/or tones. According to embodiments, an output sequence of performing the DFT of the input sequence may be considered as a reference signal sequence (e.g., a CSI-RS sequence). According to embodiments, the DFT may be the same size of the input sequence length. According to embodiments, subcarriers other than the subset of subcarriers which may be used for a reference signal (e.g., the CSI-RS) may be left unused. For example, the subcarriers other than the subset of subcarriers which may be used for transmitting zero (e.g., instead of the reference signal). According to embodiments, a set of transmit beams (e.g., a beam group which may include one or more transmit beams) may be associated with a reuse pattern from among one or more reuse patterns used for reference signals (e.g., a CSI-RS). For example, a WTRU may be configured with one or more reuse patterns (e.g., for reusing a reference signal sequence, a CSI-RS, etc.), and each reuse pattern may be associated with a beam group (e.g., a set of transmit beams). According to embodiments, a different beam group (e.g., a set of transmit beams) may be used for each reuse pattern.

According to embodiments, any of following may apply to a reuse pattern: (1) a reuse pattern may be determined as a function of at least one of a beam group ID, a number of transmit beams, a number of receive beams, a number of transmit beams within a beam group, and cell-specific parameters (e.g., a cell-ID, a subframe number, a slot number, a radio frame number, etc.); (2) a number of reuse patterns included in an OFDM symbol may be determined as a function of a number of beam groups (e.g., the number of beam groups that are configured, determined, used, etc.); (3) a maximum number of reuse patterns for a WTRU may be determined according to any number of WTRU capabilities; for example, a WTRU may indicate, report, and/or feedback capability information indicating a maximum number of CSI-RS reuse patterns; and, for example, the number of reuse patterns may be considered to be a number of beams that a WTRU may simultaneously measure and/or transmit.

According to embodiments, more than one type of a reference signal (e.g., more than one type of a CSI-RS, a SRS, etc.) may be used. According to embodiments, a first type of a reference signal (e.g., a first type of a CSI-RS) may be transmitted in a subset of subcarriers that may be located in a subband (e.g., the subset of subcarriers may be localized) and a second type of the reference signal may be transmitted in a subset of subcarriers that may be distributed over an operating frequency bandwidth. According to embodiments, the operating frequency bandwidth may be a frequency bandwidth in which a WTRU may receive or transmit signals. According to embodiments, with respect to different types of a reference signal, any of the following may apply:
  (1) a first type of a reference signal (e.g., a CSI-RS, a SRS, etc.) may be referred to as localized reference signal (e.g., a localized CSI-RS or SRS) transmitted in a subset of physical resource blocks (PRBs) that are consecutive in an operating frequency bandwidth; and, for example, the localized reference signal may be transmitted in all subcarriers within the subset of PRBs;
  (2) a second type of a reference signal (e.g., a CSI-RS, a SRS, etc.) may be referred to as distributed reference signal (e.g., a distributed CSI-RS or SRS) transmitted over all PRBs in an operating frequency bandwidth; and for example, the distributed reference signal may be transmitted in one or more subcarrier in each PRB in an operating frequency bandwidth;
  (3) any number of PRBs may be located in an operating frequency bandwidth, and, for example, the operating frequency bandwidth may be configured in a UE-specific manner or a cell-specific manner, the operating frequency bandwidth may be indicated via a broadcast channel, and/or the operating frequency bandwidth may be equal to or smaller than a system bandwidth; and, as another example, a WTRU may be informed of the operating frequency bandwidth in a case where the operating frequency bandwidth is smaller than a system bandwidth;
  (4) a first type of a reference signal (e.g., a CSI-RS, a SRS, etc.) may be used in a case where all transmit beams for sub-symbols in an OFDM symbol are different and a second type of reference signal (e.g., CSI-RS, SRS, etc.) may be used in a case where all transmit beams for sub-symbols in an OFDM symbol are the same; and, for example, the type of the reference signal may be determined based on an indication that may be transmitted in an associated DCI and/or a higher layer signaling;
  (5) a first type of a reference signal (e.g., a CSI-RS, a SRS, etc.) may be used in a case where a number of transmit beams is less than a predefined threshold, and otherwise, a second type of the reference signal may be used, or vice-versa; and
  (6) a first type of a reference signal (e.g., a CSI-RS, a SRS, etc.) may be used in a case where other types of signals (e.g., data, control, sync, etc.) may be multiplexed in the same OFDM symbol, while a second type of the reference signal may be used if other types of signals may not be multiplexed in the same OFDM symbol; for example, in a case where an OFDM symbol may be used for transmitting both CSI-RS and data, the first type of CSI-RS may be used, and in a case where the OFDM symbol may not be used for transmitting both CSI-RS and data, the second type of CSI-RS may be used.

In the above embodiments described with reference to FIGS. 6-9, it was assumed that all subcarriers, except for those subcarriers that are provided (e.g., fed, loaded with) zeros to achieve interleaved allocation, may be used for transmission. However, the present disclosure is not limited thereto, and not all subcarriers (e.g., rather than all subcarriers) may be used for transmission. According to embodiments, (e.g., certain) subcarriers at the edges of a frequency band may be left unused. For example, in LTE, in the case of a 10 MHz channel, 600 out of 1024 subcarriers are used while the remaining subcarriers at the edges are left empty. In such a case, an up-sampled sequence may be mapped to the inputs of an IDFT that correspond to the available subcarriers.

According to embodiments, in a case of guard bands (e.g., in a case where guard bands exist and/or are used for transmitting), an output of the IDFT may not be (e.g., exactly) the same as an input sequence s (e.g., that is fed into the IDFT). According to embodiments, the output of the IDFT may be an oversampled version of s while a repetitive structure of the OFDM symbol is preserved. For example, in a case where N=16 subcarriers, but only 12 of those subcarriers are available for usage, the remaining (e.g., 4) subcarriers may be used by (e.g., reserved for) the guard band. In a further case where the subcarrier indices are −8 to 7, the subcarriers −6 to 5 may be available while the subcarriers −8, −7, 6, and 7 are reserved as guard band. According to embodiments, in a case where M=6 (such that L=2), then the output of the DFT may be mapped to subcarriers −6, −4, −2, 0, 2, 4.

Figure 10:
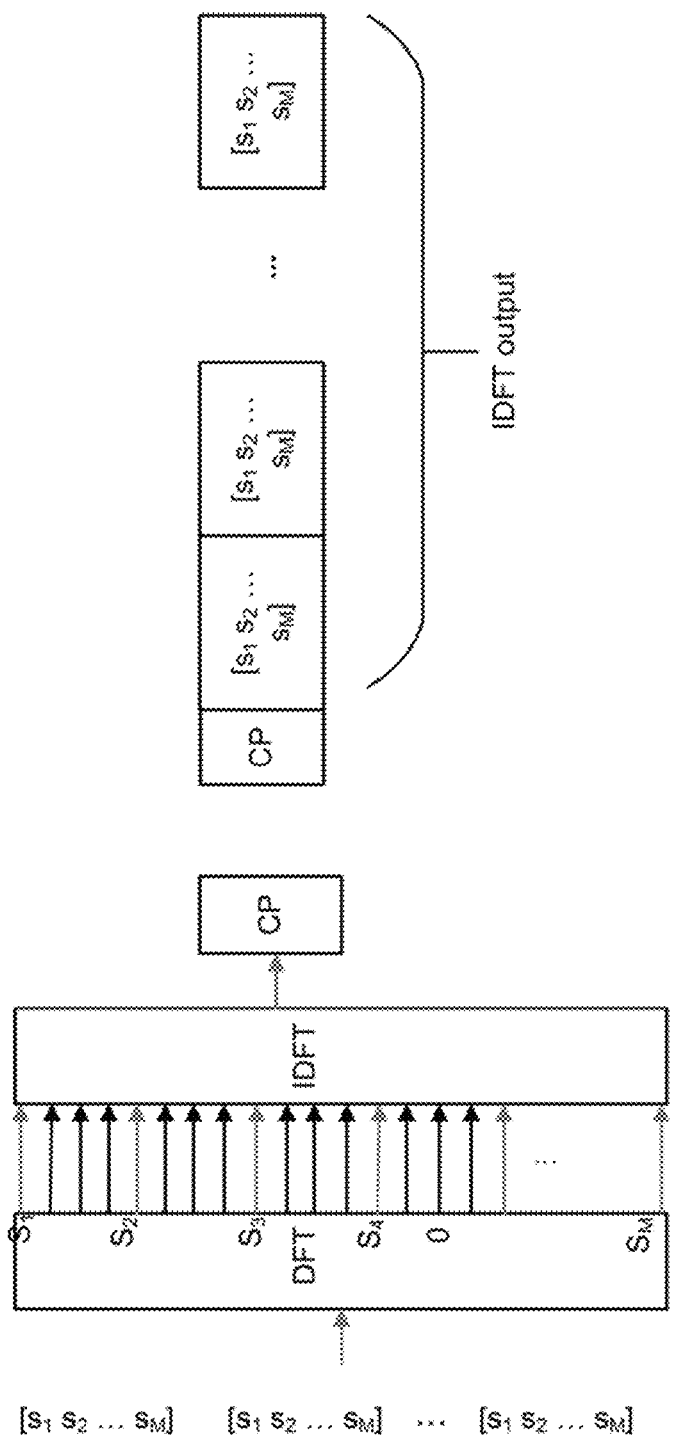
FIG. 10 is a diagram illustrating a DFT precoded IDFT CSI-RS generator of a transmitter according to embodiments.
Figure 11:
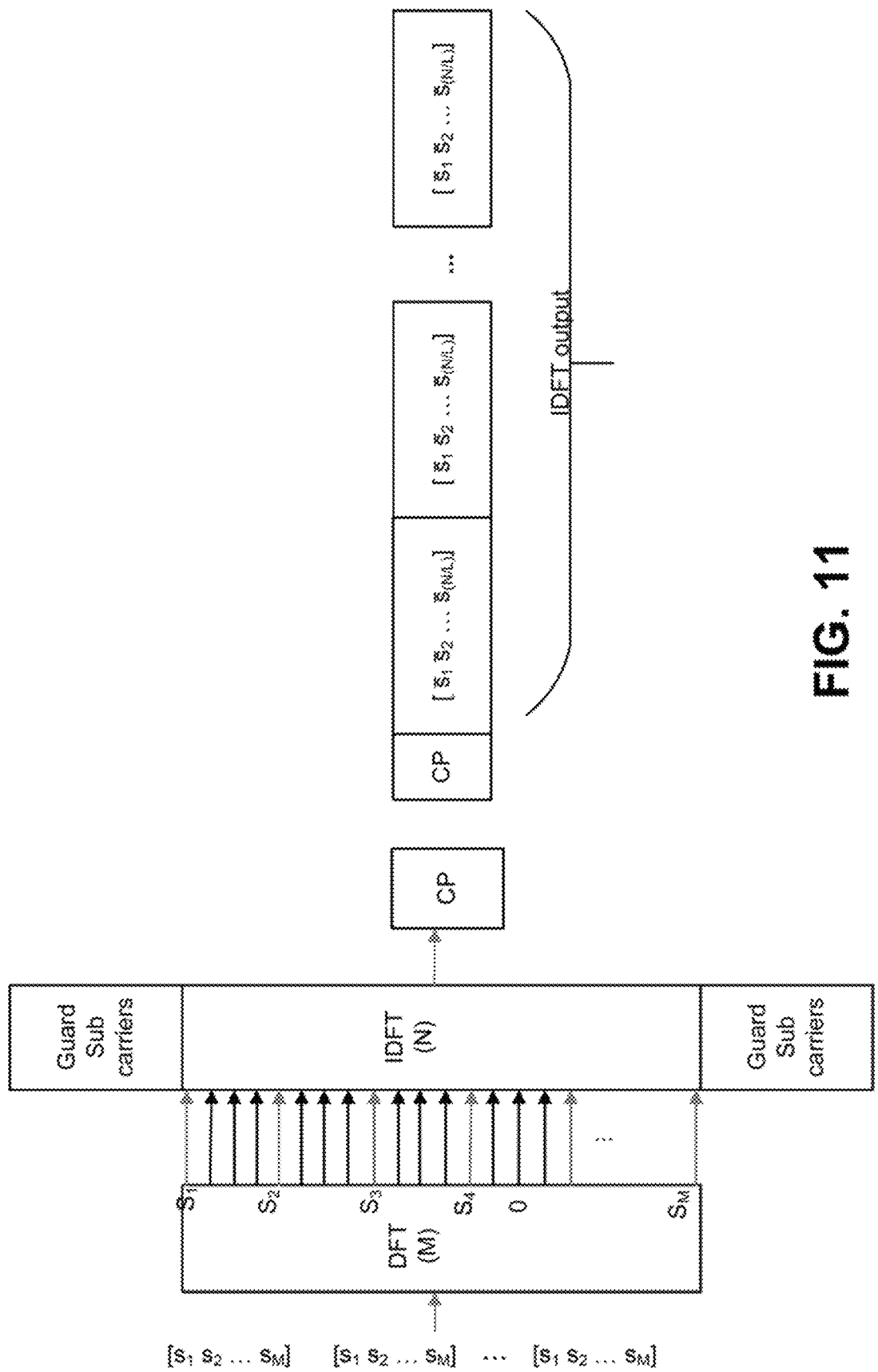
FIG. 11 is a diagram illustrating a DFT precoded IDFT CSI-RS with guard bands generator of a transmitter according to embodiments.

FIG. 10 is a diagram illustrating a DFT precoded IDFT CSI-RS generator of a transmitter according to embodiments; and FIG. 11 is a diagram illustrating a DFT precoded IDFT CSI-RS with guard bands generator of a transmitter according to embodiments.

According to embodiments, the transmitter illustrated in FIG. 10 may be an alternative (e.g., but equivalent) representation of the transmitter illustrated in FIG. 8. According to embodiments, in a case where the sequence $[s_1 \, s_2 \ldots s_M]$ is repeated L times before being processed by a DFT of size L×M, the output may be another sequence upsampled by L. In such a case, the zeros that are mapped to the zero subcarriers may be generated by the DFT operation. According to embodiments, with the guard bands, the transmitter diagram and transmitted signal may be shown as illustrated in FIG. 11, in which it is assumed that the DFT size is M, the IDFT size is N, and the number of repetitions is L. According to embodiments, the length of each sub-symbol at the output of the IDFT may be N/L and the oversampling ratio may be N/M.

Figure 12:
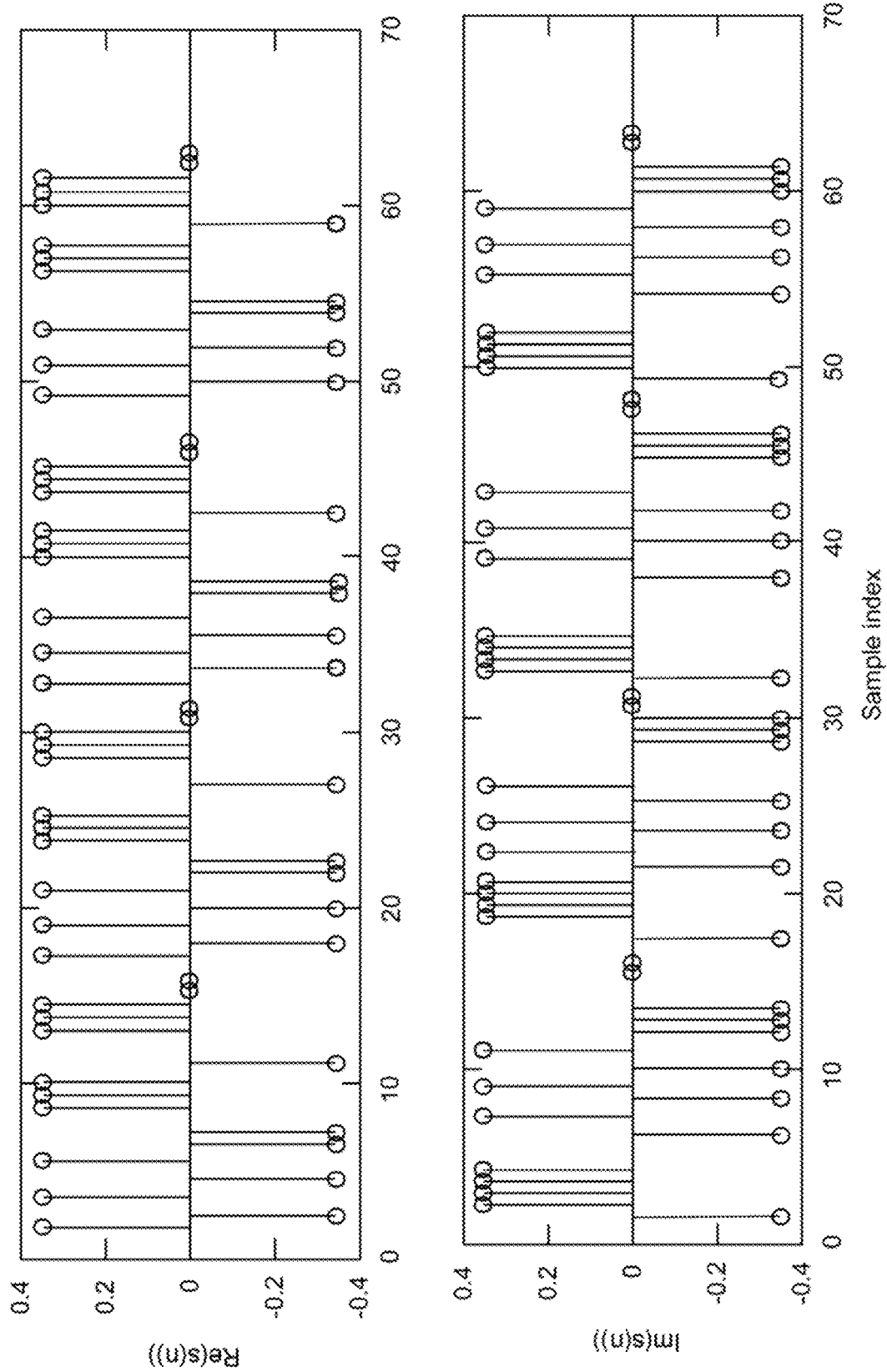
FIG. 12 is a diagram illustrating a signal including guard bands according to embodiments.

FIG. 12 is a diagram illustrating a signal including guard intervals according to embodiments. According to embodiments, the sub-symbols (e.g., inherently) include a cyclic prefix (CP) when the sub-symbols are the same, because a tail part of a sub-symbol k may be the same as a tail part of a sub-symbol k−1. However, in a case where the sub-symbols are precoded with different beamforming vectors, then consecutive sub-symbols (e.g., including their respective tail parts) may not be the same, which may result in breaking of the cyclic property. According to embodiments, in order to preserve the cyclic property, any of the following methods may be performed. According to embodiments, in order to preserve the cyclic property, the last D samples of a sequence may be set to 0, for example, the input sequence may be $[s_1 \, s_2 \ldots s_{M-D} \, 0 \, 0 \ldots 0]$.

Such a sequence may create an output sequence after the IDFT with tail samples being any of zero or very small values. According to embodiments, these samples may act as a cyclic prefix for the sub-symbols and/or may act as a guard band (e.g., guard interval). According to embodiments, the guard band may be used for beam switching. According to embodiments, a sample signal having zeros as guard intervals (e.g., having two zero samples at the end of the sequence s) is illustrated in FIG. 12. A value D may be selected as a function of a channel delay response and/or beam switching time. According to embodiments, the value of D may be configured by a central controller and/or signaled (e.g., semi-statically) and/or via a control channel.

According to embodiments, in a case where the sub-symbols do not inherently include a CP, a sequence (e.g., a reference signal sequence) may be designed to have an internal cyclic prefix. According to embodiments, the internal cyclic prefix may be achieved by setting first and last D samples of the sequence to the same value. For example, in a case where D=2, then the sequence may be $[s_{M-1}\ s_M\ s_1\ \ldots\ s_{M-2}\ s_{M-1}\ s_M]$.

According to embodiments, a reference signal (e.g., a CSI-RS, an SRS, etc.) sequence may be generated, determined, and/or selected using a DFT operation. According to embodiments, the reference signal sequence may be the output of the DFT operation. According to embodiments, an input signal of the DFT operation may be referred to as an input reference signal. However, the present disclosure is not limited to a DFT performing the DFT operation, and, according to embodiments, the DFT may be replaced with other functions (e.g., FFT). According to embodiments, any number of sub-sequences may be used for a CSI-RS input sequence, and a sub-sequence length may be shorter than the CSI-RS input sequence. According to embodiments, the number of sub-sequences may be the same as the number of sub-symbols in an OFDM symbol. According to embodiments, any of the sub-sequences may have a same length for a CSI-RS input sequence, and further, each sub-sequence may be associated with a sub-symbol. According to embodiments, each sub-sequence may include null symbols (e.g., a symbol having zero value). In such a case, a WTRU may be indicated the number of null symbols used for sub-sequence when a UE is configured, determined, or indicated to send an SRS.

According to embodiments, any one or more of the sub-sequences for a first type of reference signal (e.g., a localized CSI-RS, a localized SRS, etc.) may be determined according to any of (1) a same sequence used for one or more sub-sequences, in a case where transmit beams for all sub-symbols are the same; and (2) a different sequence used for each sub-sequence, in a case where the transmit beam is different across sub-symbols. According to embodiments, any one or more sub-sequence for the second type of reference signal (e.g., a distributed CSI-RS, distributed SRS, etc.) may be determined according to a same sequence used for one or more sub-sequences. According to embodiments, the same sequence for all sub-sequences may be used in a case where the subset of subcarriers for a reference signal (e.g., CSI-RS) is based on the second type of CSI-RS. According to embodiments, a different sequences for any of the sub-sequences may be used in a case where the subset of subcarriers for the reference signal is based on the first type of the reference signal, or vice-versa.

According to embodiments, a DFT input sequence (which may be referred to as DFT tones and/or DFT input tones) may be subdivided into any number of segments (which may be referred to as intervals). According to embodiments, any of the DFT input tones may be a reference signal tone. The reference signal tones may be part of an input reference signal. A segment/interval of the DFT input tones may include a chunk. The chunk may include one or more DFT input tones. A chunk may be a reference signal chunk, for example. The reference signal chunk may include one or more reference signal tones. According to embodiments, the reference signal tones may be located locally, proximately, adjacently, or consecutively with respect to each other. For example, reference signal tones that are located consecutively within a segment may be referred to as a reference signal chunk. A size of a chunk, (e.g., a chunk size) may be described as and/or may indicate the number of reference signal tones within the chunk. According to embodiments, reference signal tones included in a reference signal chunk may be used for any of phase tracking or beam management. Herein, the terms 'segment', 'interval', 'part', and 'subset of DFT inputs' may be used interchangeably. In addition, the terms 'tone', 'resource element (RE)', and 'sample' may be used interchangeably.

Figure 32:
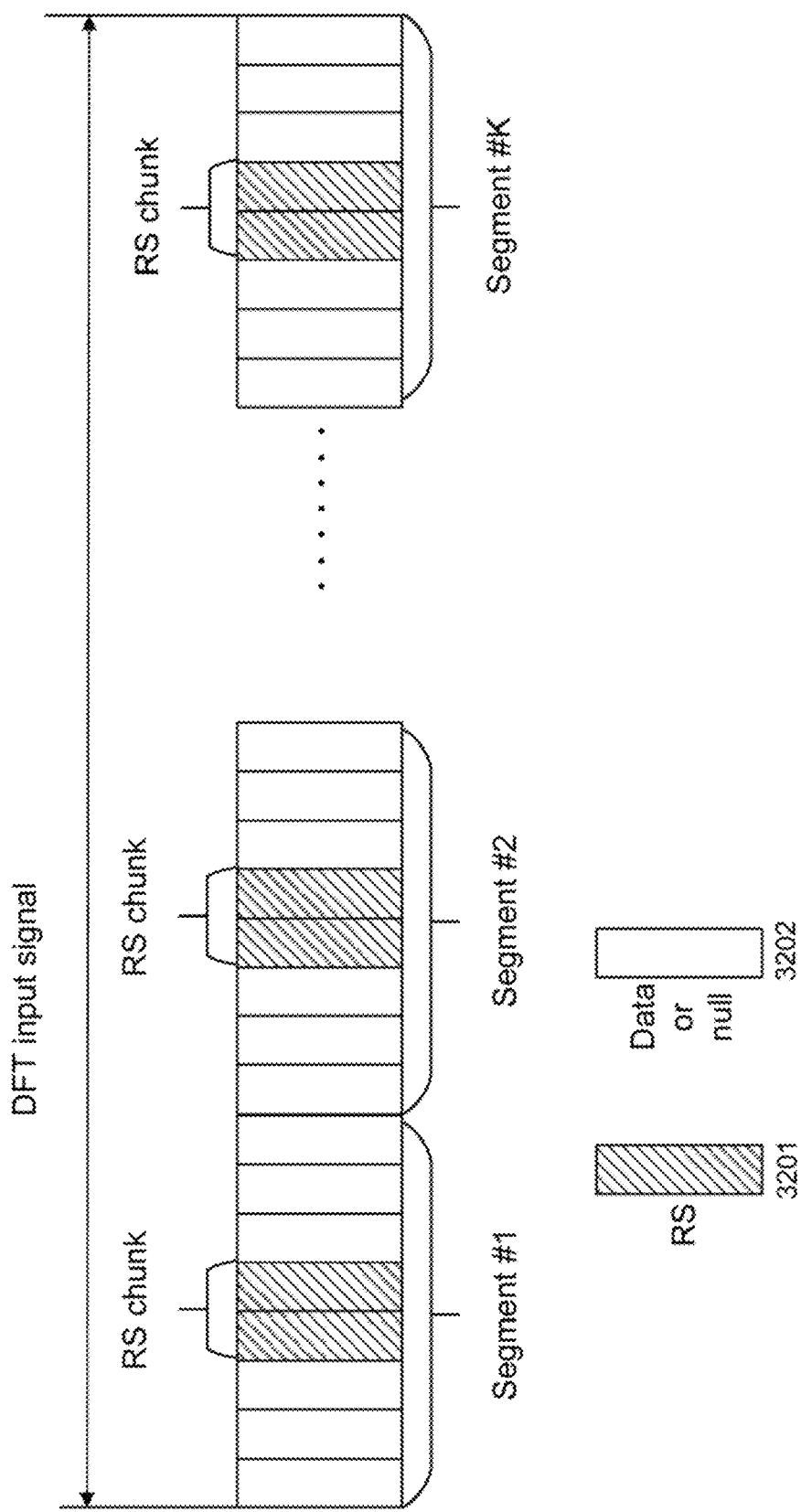
FIG. 32 is a diagram illustrating a segmented DFT input with two types of DFT input tones according to embodiments.

FIG. 32 is a diagram illustrating an example DFT input sequence. According to embodiments, at least two types of DFT input tones may be used in a segment. As shown in FIG. 32, for example, each segment includes first and second types of DFT input tones 3201, 3202. The first type of DFT input tone 3201 may be a reference signal tone. The second type of DFT input tone 3202 may be a tone used for a data signal and/or null signal (e.g., a data tone, a null tone, etc.). According to embodiments, the second type of DFT input tone 3202 may be a data tone, such as a PUSCH transmission, and the first type of DFT input tone 3201 may be a reference signal tone that is used for demodulation. According to embodiments the second type of DFT input tone 3202 may be a null tone and the first type of DFT input tone 3201 (e.g., a reference signal tone) may be used for measurement. Herein, the term null and/or null tone may refer to as a zero-power signal, a muted RE, a muted resource, a punctured resource, a rate-matched resource, and/or a guard tone.

According to embodiments, a chunk size may be determined based on a scheduling parameter of data multiplexed with the reference signal tone. For example, the chunk size may be determined based on the scheduling parameter of the data when the second type of DFT input tone 3202 is a data tone. The scheduling parameter may include and/or indicate any of a scheduled bandwidth, a MCS level, a modulation order, a transmission power, a numerology, and a waveform. According to embodiments, in the case of the second type of DFT input tone 3202 being the data tone, any of the following may apply:

(1) the chunk size may be determined based on a scheduling parameter of the data multiplexed with the reference signal tone, wherein the scheduling parameter may include any of a scheduled bandwidth, a MCS level, modulation order, a transmission power, a numerology, and a waveform;

(2) the number of segments may be determined based on the scheduling parameter of the data multiplexed with the reference signal tone;

(3) the location of a chunk (e.g., the location of a center, a head, or a tail of a reference signal chunk) within a segment is any of: predetermined, configured, or determined based on a scheduling parameter of the data, for example, the location of chunk may be in the middle of the segment if the location of chunk is predetermined;

(4) the presence of a chunk (or reference signal tones) within a segment may be determined based on any of scheduling parameters and higher layer signaling (for example, if a scheduled bandwidth is less than a threshold, the chunk may not be present for a data transmission, or, for example, if a scheduled MCS is less than a threshold, the chunk may not be present for a data transmission);

(5) the chunks within a time window (e.g., DFT-s-OFDM symbol, OFDM symbol, slot, mini-slot, or TTI) may use a same beam or may be associated with a same beam; for example, reference signal chunks may be: (i) quasi-co-located (QCL-ed) with respect to at least spatial receive parameters, or (ii) QCL-ed with respect to all quasi-co-location (QCL) parameters;

(6) a bandwidth of an uplink transmission may be scheduled via a DCI associated with a PUSCH transmission; and (7) a sequence for the reference signal tones may be determined based on WTRU-specific parameters (e.g., WTRU-ID, scrambling ID configured via a higher layer signaling, and/or a scheduling parameter), wherein the WTRU-ID may be an RNTI used for scheduling.

According to embodiments, in the case of the second type of DFT input tone 3202 is a null tone, any of the following may apply:

(1) the chunk size may be configured via a higher layer signaling or predetermined;

(2) the number of segments may be determined based on at least one of higher layer signaling, WTRU capability, or the number of beams used;

(3) the location of the chunk within a segment may be fixed (e.g., a location of a head of the chunk is fixed) or determined based on the location of a chunk for another DFT-s-OFDM symbol (or OFDM symbol) which may be used for data transmission;

(4) the chunk may be always present;

(5) chunks within a time window (e.g., DFT-s-OFDM symbol, OFDM symbol, slot, mini-slot, or TTI) may be associated with different beams (e.g., reference signal chunks are non-QCL-ed with respect to at least spatial Rx parameters);

(6) a bandwidth of an uplink transmission may be configured via a higher layer signaling;

(7) a sequence for the reference signal tones may be determined according to associated beam information (e.g., beam ID);

(8) any of the chunk size or the number of segments may be determined based on a frequency range (e.g., below 6 GHz or above 6 GHz);

(9) any of the chunk size or the number of segments may be determined based on a number of synchronization signal (SS) blocks, wherein the number of SS blocks may be any of: a maximum number of SS blocks in a frequency range (e.g., a certain frequency range), a number of transmitted SS blocks (e.g., actually transmitted SS blocks), or a configured number of SS blocks; and

(10) any of the chunk size or the number of segments may be determined based on a numerology (e.g., subcarrier spacing, CP length). According to embodiments, when a DFT input signal is split into segments and/or chunks, there may be any number of modes of operations for a transmitter and/or for transmitting DFT-s-OFDM symbols. For example, two modes of operations may be used, wherein a first mode of operation may be associated with a case where the second type of DFT input tone 3202 is used for data, and wherein a second mode of operation may be associated with a case where the second type of DFT input tone 3202 is used for null. According to embodiments, the first and/or second mode of operation may be used on any of: a per symbol level (e.g., DFT-s-OFDM symbol, OFDM symbol), a slot level (e.g., slot or mini-slot), and a TTI level. For example, within a scheduled TTI, a first set of DFT-s-OFDM symbols may be associated with the first mode of operation and a second set of DFT-s-OFDM symbols may be associated with the second mode of operation. According to embodiments, the second mode of operation may be to use null for the DFT input tones not occupied by reference signal tones. In such a case, a WTRU may be configured to use the second mode of operation for a subset of DFT-s-OFDM symbols, wherein the DFT-s-OFDM symbols configured for the second mode of operation may be used for beam training. For example, in the case of beam training, each segment may be associated with a beam (e.g., Tx beam).

According to embodiments, a beam used for a segment (e.g., the beam used for each segment) may be determined based on an associated reference signal. According to embodiments, an associated reference signal may be any of a downlink reference signal (e.g., CSI-RS, DM-RS, TRS, PTRS, or SS block) or a SRS. The associated reference signal may be QCL-ed with reference signal tones within a segment, for example, with respect to at least a spatial reception parameter (e.g., QCL type 4). According to embodiments, the transmission power of reference signal tones (e.g., in each segment) may be determined based on an associated downlink reference signal. For example, pathloss may be determined (e.g., measured, calculated, etc.) based on (e.g., from) the associated reference signal and the determined pathloss may be compensated for in a transmission. As another example, a single reference signal may be associated with one or more segments and the transmission power may be the same across the segments which share the same associated reference signal. According to embodiments, in a first mode of operation for beam management (e.g., transmit beam training), each segment may be associated with a reference signal and the (e.g., each) associated reference signal may be different across segments. According to embodiments, in a second mode of operation for beam management (e.g., receive beam training), any number of segments may be associated with a same reference signal, and any number of segments may be located in a same symbol (e.g., DFT-s-OFDM symbol or OFDM symbol).

According to embodiments, the reference signal tones may have a same transmission power. The reference signal tones may be associated with the same transmission power allocation formula for any of number of modes of operation, for example, for both the first and the second modes of operation. According to embodiments, the transmission power of the reference signal tones may be determined according to the mode of operations, wherein a higher transmission power may be used for one of the modes of operation (e.g., for the second mode of operation). According to embodiments, when a first mode of operation is used for all DFT-s-OFDM symbols within a TTI (e.g., slot or mini-slot), the reference signal tones may be located or transmitted within a subset of DFT-s-OFDM symbols. According to embodiments, a reference signal tone for the first mode of operation may be referred to as a phase tracking reference signal (PTRS) and a reference signal tone for the second mode of operation may be referred to as a SRS. According to embodiments, the first mode of operation may be used irrespective of numerology (e.g., subcarrier spacing) and the second mode of operation may be used for (e.g., only) a subset of numerology (e.g., for subcarrier spacing larger than a threshold, such as 15 kHz).

According to embodiments, in a case of using the second mode of operation (e.g., using null tones for the DFT input tones not occupied by reference signal tones), the location of a chunk within a segment may be determined according to any of a WTRU-specific manner or cell-specific manner. For example, the chunk location may be a function of WTRU-specific parameter, such as any of a WTRU-ID, a C-RNTI, or a scrambling ID configured via a WTRU-specific higher layer signaling. According to embodiments, the chunk location may be a function of physical cell-ID.

According to embodiments, in a first mode of operation (e.g., a mode including using data tones for the DFT input tones not occupied by reference signal tones) may be used for uplink transmission in a case of a DFT-s-OFDM waveform (e.g., when the DFT-s-OFDM waveform is used). According to embodiments, a second mode of operation (e.g., a mode including using null tones for the DFT input tones not occupied by reference signal tones) may be used for any of uplink transmission or downlink transmission, for example, without consideration of the waveform used.

According to embodiments, the use of any of the first mode of operation or second mode of operation may be determined at a segment level. For example, any number of segments may be located in a symbol (e.g., DFT-s-OFDM symbol) and, according to embodiments the use of the first mode of operation or the second mode of operation may be determined based on which reference signal is associated with a segment. For example, the first mode of operation may be used for a first segment in a case where the first segment is associated with a first reference signal and the second mode of operation may be used for a second segment in a case where the second segment is associated with a second reference signal. As a further example, the first reference signal may be the same reference signal that is associated with data in another symbol (e.g., QCL-ed with DM-RS for data transmission) and the second reference signal may be a different reference signal from the first reference signal. According to embodiments, the first reference signal and the second reference signal may be determined based on the reference signal type (e.g., CSI-RS, TRS, SS block, SRS).

According to embodiments, in a case of a first mode of operation, reference signal tones may be (e.g., may be referred to as) phase tracking reference signal (PTRS) and, in a case of a second mode of operation, reference signal tones may be (e.g., may be referred to as) beam tracking reference signal (BTRS). As referred to herein, BTRS may be interchangeably used with any of sub-time unit RS (STURS), sub-time RS (STRS), beam reference signal (BRS), sounding reference signal (SRS), or beam training reference signal (BTRS).

Sub-Unit CSI-RS Generation with IDFT and Multiple DFT Blocks

According to embodiments, more than one repetitive signal may be generated such that each (e.g., of the repetitive) signal may be transmitted from a different antenna port. According to embodiments, the different antenna ports may be associated with (e.g., belong to) a same transmitter or any of the different antenna ports may be associated with different transmitters. According to embodiments, interference between the two signals in a given domain (e.g., frequency and/or time domain) should be zero or small such that reliable measurement of the beam(s) and/or channel state information may be achieved.

According to embodiments, any number of localized reference signals (e.g., the first type of a CSI-RS) may be used, and the localized reference signals may be transmitted in a same OFDM-symbol in non-overlapped frequency locations. According to embodiments, in a case where the localized reference signals are transmitted in the same OFDM-symbol in non-overlapped frequency locations, any of following may apply:
(1) each localized CSI-RS may be generated with a DFT operation and the output sequence (e.g., CSI-RS sequence) may be transmitted in a frequency location;
(2) each localized CSI-RS may be associated with a beam group that may include one or more beams (e.g., or beam indices);
(3) a frequency location of localized CSI-RS may be determined based on any of the following: (i) a beam group identity that may be predetermined or configured via higher layer signaling; (ii) a number of transmit beams; (iii) a number of localized CSI-RSs transmitted in the same OFDM symbol; (iv) cell specific parameters, such as a cell-ID, a subframe number, a slot number, a frame number, etc., (wherein, the cell may be interchangeably referred to as a TRP, a macro cell, a serving cell, a primary cell, etc.); and (v) higher layer configuration;
(4) a UE may be configured (e.g., indicated, signaled, informed, etc.) with information indicating a localized reference signal (e.g., CSI-RS) to use for a measurement when multiple localized reference signals are used. For example, a set of localized CSI-RS configurations may be used for a group of UEs and a UE may be indicated as to which of the set of localized CSI-RS configurations to use for a measurement; and
(5) a number of subcarriers used for a localized CSI-RS may be independently or separately configured.

Figure 13:
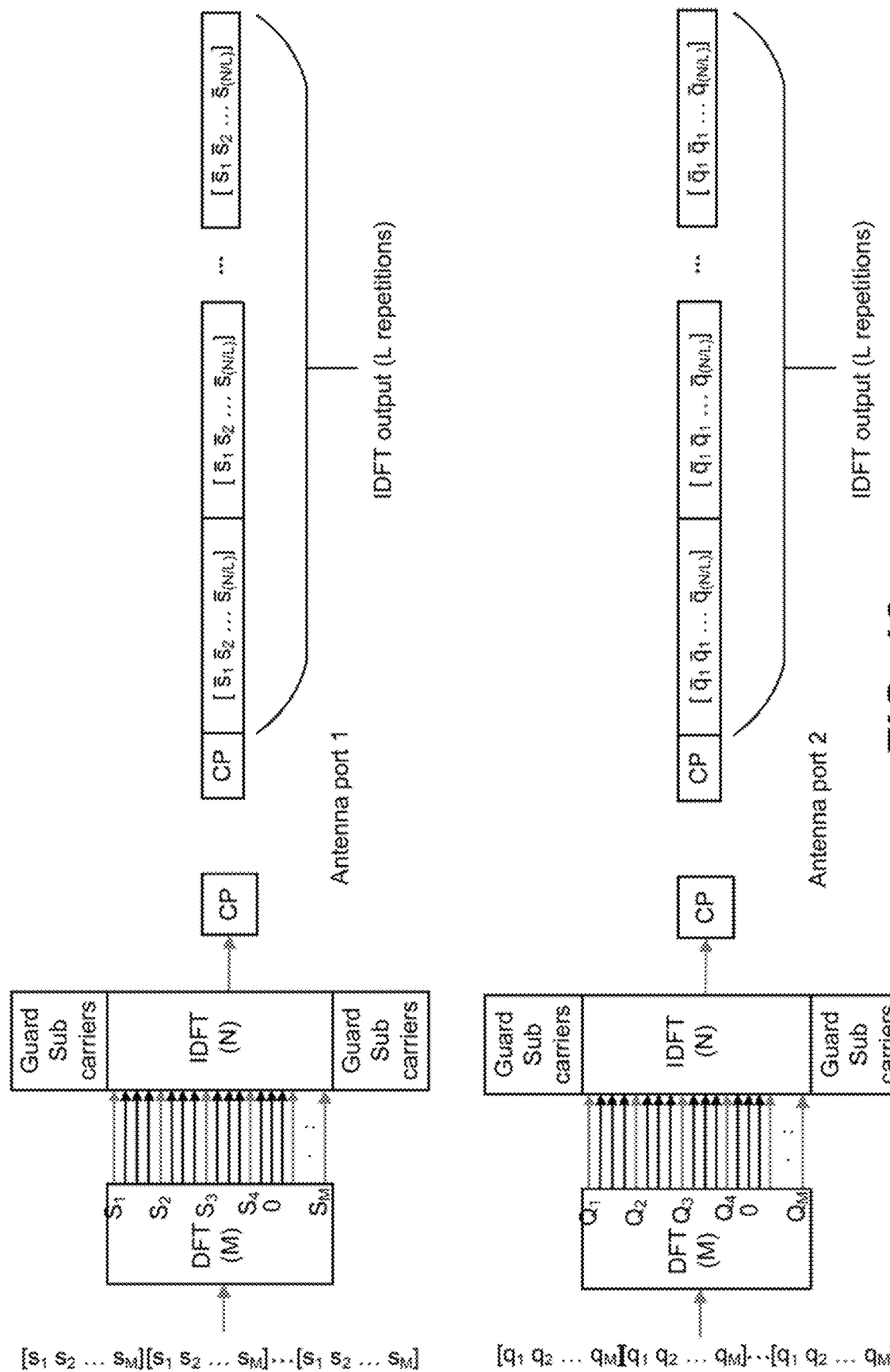
FIG. 13 is a diagram illustrating sub-unit CSI-RS generation with IDFT and multiple DFT blocks according to embodiments.

FIG. 13 is a diagram illustrating sub-unit CSI-RS generation with IDFT and multiple DFT blocks according to embodiments.

According to embodiments, in a case where the same subcarriers are used at the antenna ports, the sequences may be configured (e.g., selected, designed, etc.) such that the sequences are separated in time domain, as illustrated in FIG. 13 (which illustrates a conceptual transmitter). According to embodiments, the DFT step may be skipped such that two (or more) sequences may be directly mapped to a same set of interleaved of subcarriers. According to embodiments, at a receiving antenna port, the received sequences may be separated in the time domain. For example, a receiver associated with the receiving antenna port may (e.g., first) apply a DFT, may (e.g., then) select a subband of interest, and may (e.g., then) transform the received sequences to the time domain using an IDFT such that the sequences output by the IDFT are separated in the time domain.

Figure 14:
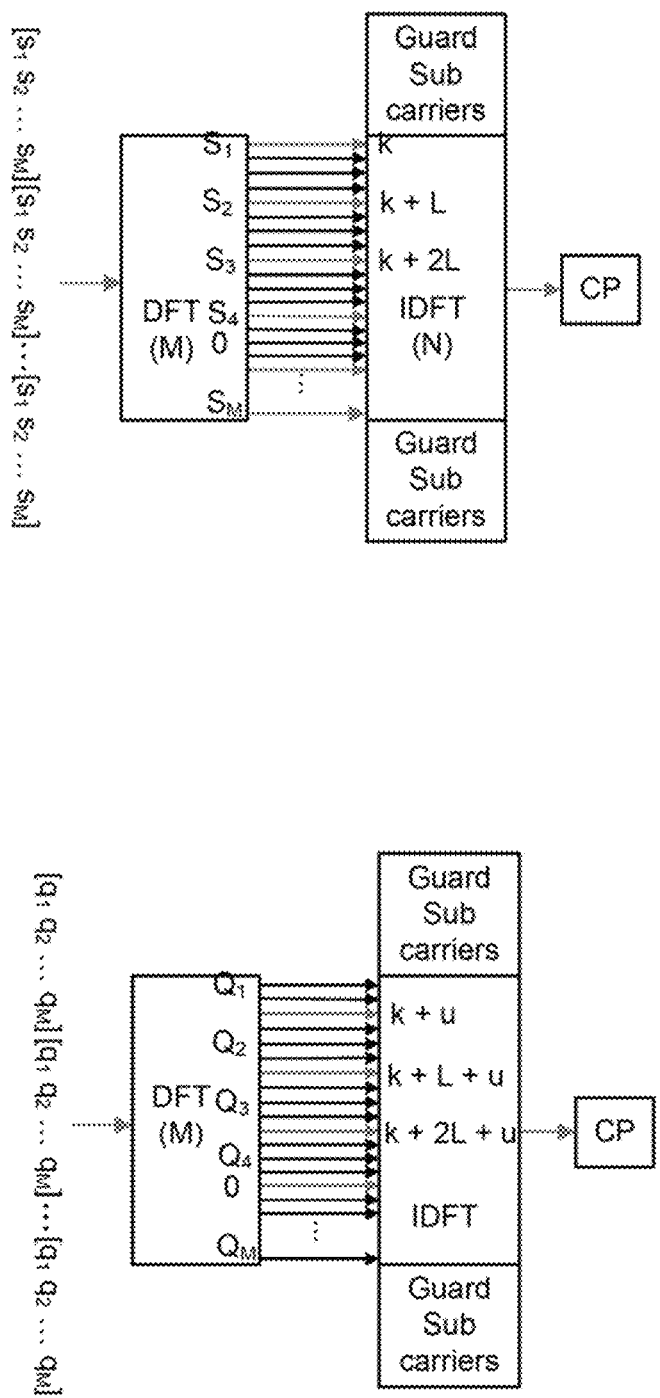
FIG. 14 is a diagram illustrating sub-unit CSI-RS generation with IDFT and multiple DFT blocks according to embodiments.

FIG. 14 is a diagram illustrating sub-unit CSI-RS generation with IDFT and multiple DFT blocks according to embodiments.

According to embodiments, two or more sequences may be separately precoded using a DFT and may be (e.g., then) mapped to interleaved subcarriers. Further, the set of subcarriers for different sequences may be disjointed (e.g., the sequences are separated in the frequency domain. Referring to FIG. 9, two sequences are illustrated as being mapped to different set of subcarriers according to embodiments.

According to embodiments, as discussed above with reference to Property 1, after the IDFT operation, a time domain signal may include repeated sequences. For example, the time domain signal outputted by the IDFT unit may have a repetitive structure. According to embodiments, in a case where indices of the subcarriers having (e.g., carrying, loaded with) data are 0, L, 2L, . . . etc., the time domain signal may consist of same sub-time units. According to embodiments, in a case where a different set of subcarriers are used within the same subband as the original signal, the IDFT operation may output (e.g., generate) a repetitive signal in time domain.

According to embodiments, indices of the subcarriers having (e.g., carrying, loaded with) data may be changed to u, L+u, . . . , etc. That is, according to embodiments, an index of a subcarrier may be shifted by u subcarriers. In the case of shifted subcarriers, an output of the IDFT may be $$z(n)\exp\left(\frac{j2\pi un}{N}\right).$$

Thus, according to embodiments, a phase offset to each sample may be introduced (e.g., by shifting a subcarrier by u subcarriers).

In the case of shifted subcarriers, due to the phase offset being a function of the time index n, a resulting sequence (e.g., a sequence output by an IDFT, may no longer have the same repetitive structure as compared to a case having no shifted (e.g., used) subcarriers. Further, in the case of shifted subcarriers, the sub-units may not have an inherent CP. According to embodiments, in the case of shifted subcarriers, the signal that is input to the DFT may have zero samples at the tail, which may still act as a CP for each sub-unit, which may preserve circular convolution of the inputted signal.

According to embodiments, a repetitive structure may be maintained in the case of no shifted subcarriers (e.g., when u≠0). For example, in a case where n=N/u, then $$\exp\left(\frac{j2\pi un}{N}\right) = 1,$$

wherein $$z(0) = z\left(\frac{N}{u}\right), z(1) = z\left(\frac{N}{u} + 1\right), \ldots, \text{etc.}$$

That is, according to embodiments, for a given u, the time domain signal after the IDFT may have $$\frac{N}{u}, u \neq 0$$

sub-time units. According to embodiments, an example set of conditions are shown in Table 1 for a case where L=8.

TABLE 1

| # of sub-units | L | u | Indices of subcarriers $k = mL + u, m = 0, 1, \ldots \left(\frac{N}{L}\right) - 1$ |
|---|---|---|---|
| 8 | 8 | 0 | 0, 8, 16, ..., N – L |
| 2 | 8 | 2 | 2, 10, 18, ..., N – L + 2 |
| 4 | 8 | 4 | 4, 12, 16, ..., N – L + 4 |

Figure 15:
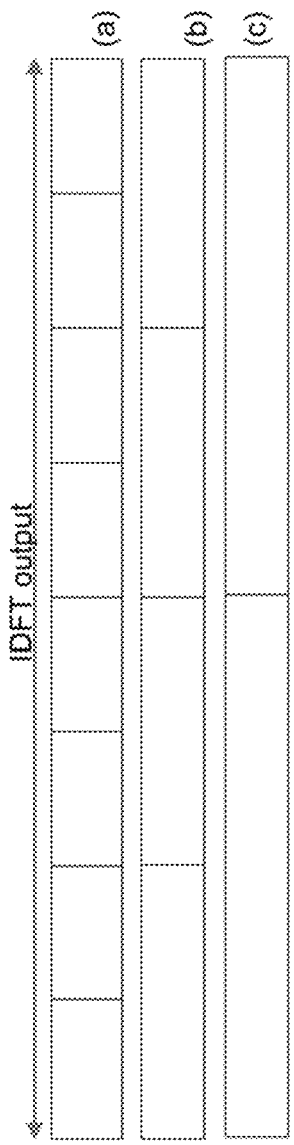
FIG. 15 is a diagram illustrating IDFT outputs according to embodiments.

FIG. 15 is a diagram illustrating IDFT outputs according to embodiments. Referring to FIG. 15, according to embodiments, example (a) has 8 repetitions with u=0, example (b) has 4 repetitions with u=4 and example (c) has two repetitions with u=2. According to embodiments, in a case where $L=2^\ell$,, we may $\ell$ signals with exact repetitive sub-time units and each of the $\ell$ signals may have $2^1, 2^2, \ldots,$ $2^\ell$ repetitions, wherein signal is generated by a different subcarrier allocation.

According to embodiments, the methods for generating a reference signal (e.g., a CSI-RS, a SRS, etc.) allows for a larger set of subcarriers (to be used) for reference signal generation. For example, a first transmitter may use a set of subcarriers with u=0 for beam management, and a second transmitter (that may be interfering with the first transmitter) may use a set of subcarriers with u=2 for beam management. According to embodiments, the duration of a sub-symbol may be used for determining a signal power, and a repetitive signal with a longer sub-symbol may be preferred when higher SINR at a receiver is needed (e.g., desirable). Further, according to embodiments, if the power of a short sub-symbol is sufficient, then a repetitive signal with a shorter sub-symbol may be used.

According to embodiments, a type of the signal may indicate how many repetitions the signal includes (e.g., provides) in an OFDM symbol. According to embodiments, the type of the signal may be controlled by a central controller and may be signaled to transmitters and/or receivers. According to embodiments, the type of the signal may be a function of any of a transmit power, noise and/or interference levels at the receiver, a beam width, and/or any other similar and/or suitable signal characteristic.

Sub-Unit CSI-RS Generation with IDFT and Multiple DFT Blocks

Figure 16:
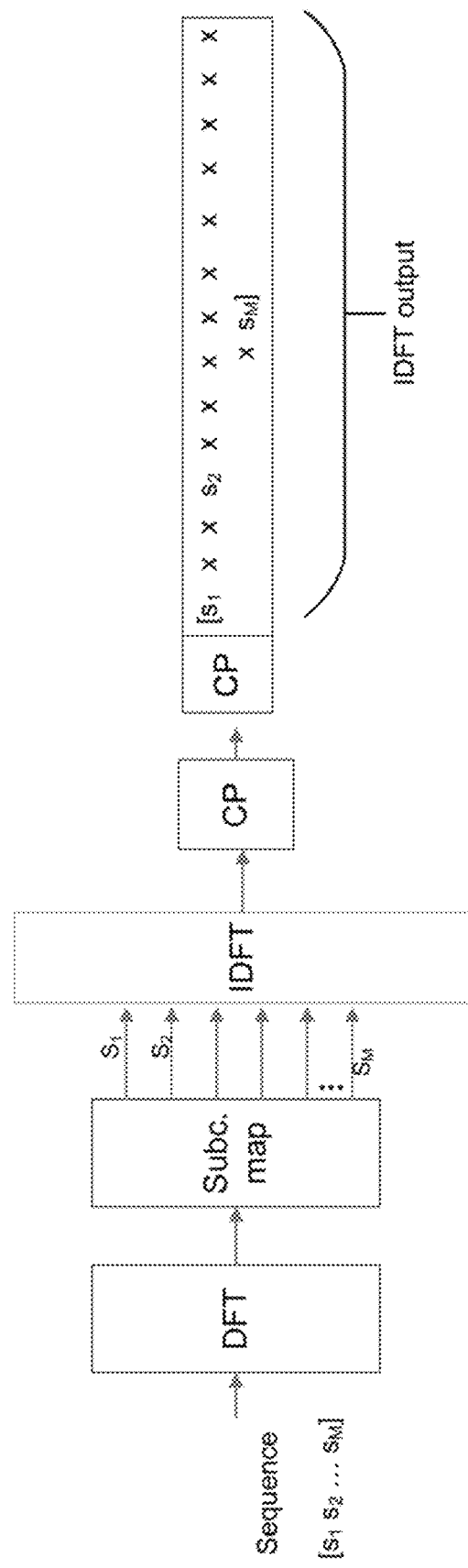
FIG. 16 is a diagram illustrating sub-unit CSI-RS generation with DFT-s-OFDM according to embodiments.
Figure 17:
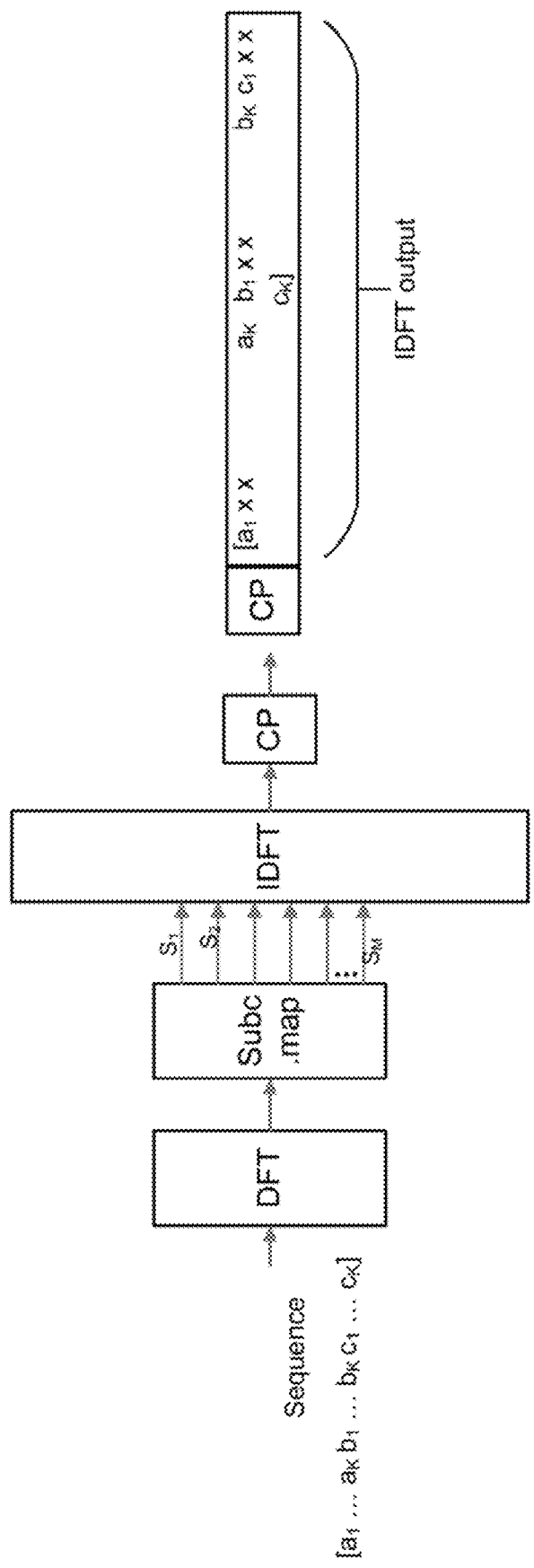
FIG. 17 is a diagram illustrating sub-unit CSI-RS generation with DFT-s-OFDM according to embodiments.
Figure 18:
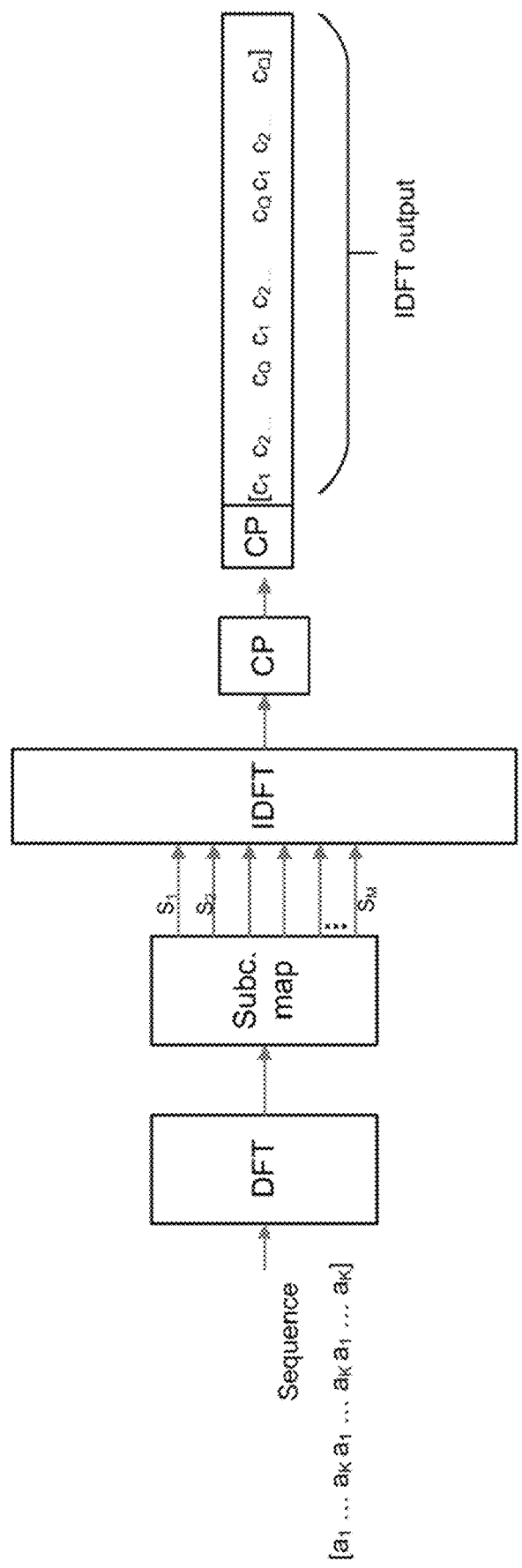
FIG. 18 is a diagram illustrating sub-unit CSI-RS generation with DFT-s-OFDM according to embodiments.
Figure 19:
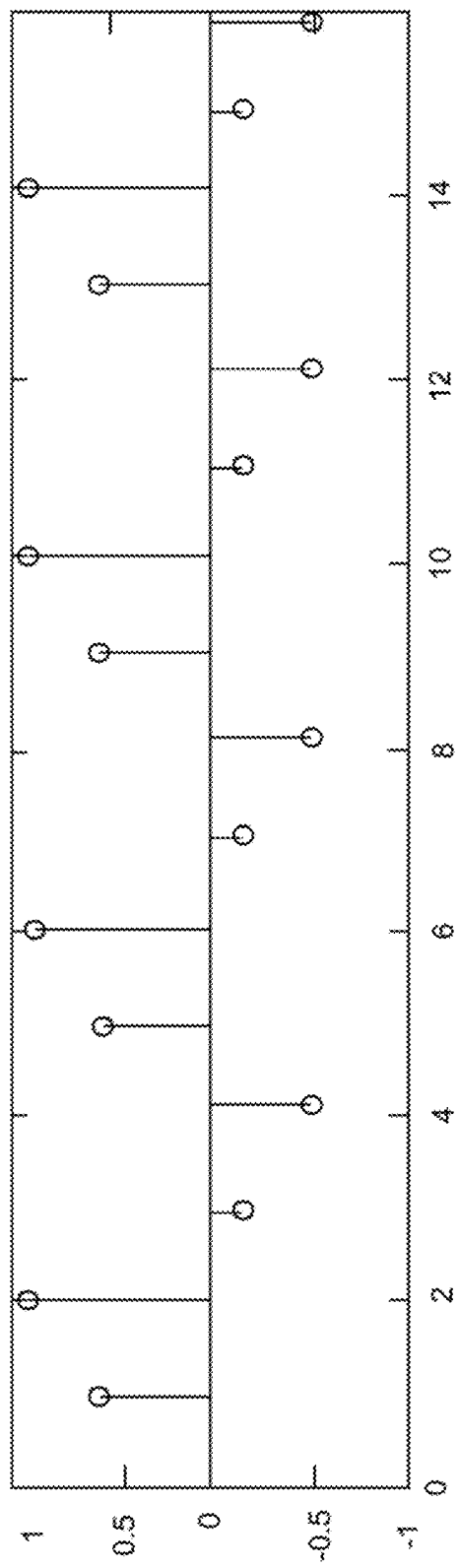
FIG. 19 is a diagram illustrating a signal according to embodiments.
Figure 19:
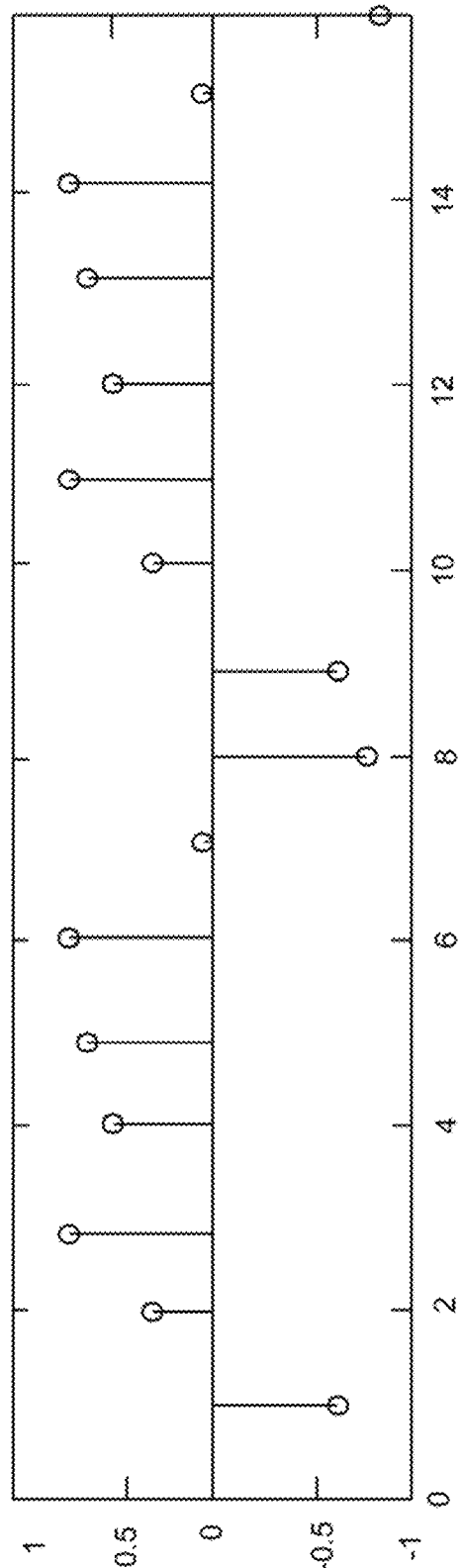

FIGS. 16, 17 and 18 are diagrams illustrating sub-unit CSI-RS generation with DFT-s-OFDM according to embodiments. FIG. 19 is a diagram illustrating a signal according to embodiments.

According to embodiments, an output of the DFT block may be mapped to a contiguous set of subcarriers within the IDFT. For example, the signal at the output of the IDFT may be an oversampled version of the sequence fed into the DFT, wherein, referring to FIG. 16, the letter x denotes time domain samples that are generated due to upsampling. According to embodiments, in a case where the DFT size is M and the IDFT size is N, the input sequence may be upsampled with a ratio of N/M. According to certain embodiments, in the case of upsampling, the sequence at the output of the IDFT may not contain the same samples as they were input to the DFT, i.e., $s_1, s_2, \ldots, s_M$.

According to embodiments, there may be a case where the sequence input to the DFT has (e.g., potentially) different sub-sequences. In such a case, according to embodiments, the output of the IDFT may consist of oversampled versions of the sub-sequences as shown in FIG. 17. According to embodiments, the sub-sequences may be configured (e.g., may have a structure) to compensate for beam switching time and/or channel delay spread. Such sub-sequences may have any of the following structure: (1) the last D samples of the sequence may be set to 0 (e.g., the input sequence may be [a1 a2 ... aK–D 0 0 ... 0]); or (2) the sequence may be designed to have an internal cyclic prefix (e.g., the first and last D samples of the sequence may be set to the same value, such as, in a case where D=2, then the sequence may be [aK–1 aK a1 ... aK–2 aK–1 aK]). According to embodiments, the sub-sequences may be used to carry additional information, for example beam ID, etc.

According to embodiments, the columns of an orthogonal matrix may be applied to expand a subsequence and a transmitter may transmit the expanded sequence with DFT-s OFDM symbols from antennas. In a case where a is the subsequence and $c_i$ is the ith column of an orthogonal matrix P, an expanded sequence may be expressed as e=$c_i \otimes$a, wherein $\otimes$ is Kronecker product. According to embodiments, in order to maintain the cyclic property, a CP and/or a cyclic suffix may be added to any of e or a. According to embodiments, the expanded sequences may be formed with a DFT-s-OFDM core and may (e.g., then) be transmitted with any number of antenna ports. For example, the P matrix may be chosen as a Hadamard matrix. According to embodiments, a DFT-s-OFDM symbol may include a unique word or a CP. According to embodiments, the P matrix and the subsequence matrix should (e.g., need to) be signaled. According to embodiments, the subsequence may be a Golay sequence or a Zadoff-Chu sequence.

According to embodiments, in a case where the subsequences are selected to be the same, then the output signal may have repeating sub-time units as shown in FIG. 18. Referring to FIG. 19, an example signal is shown for M=12 and N=16, wherein the input sequence has two same subsequences. According to embodiments, the structure of the signal shown in FIG. 19 may be the same as that shown in FIG. 13.

Figure 20:
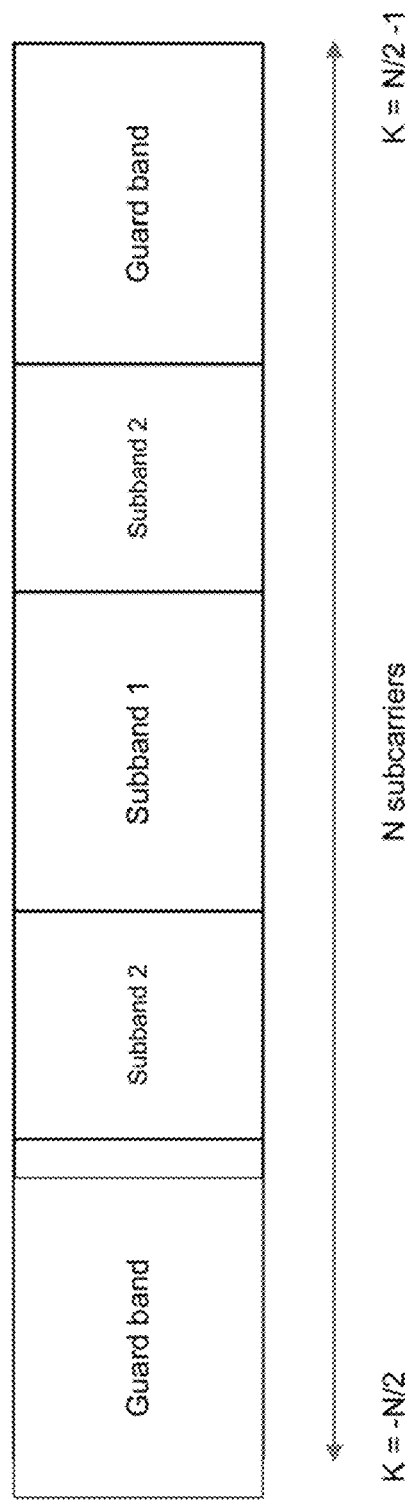
FIG. 20 is a diagram illustrating subbands for CSI-RS generation according to embodiments.

FIG. 20 is a diagram illustrating subbands for CSI-RS generation according to embodiments.

According to embodiments, in the above described examples, it may be assumed that the center subcarriers including the zero subcarrier are used to transmit the sequences. Further, according to embodiments, a repetitive signal may be generated in a case where another subband other than the center subband is used. According to embodiments, the (e.g., specific) subband may depend on (e.g., may be selected, determined, etc., according to) any of the subband size, the IDFT size, or the number of guard band subcarriers. For example, the band shown in FIG. 20 illustrates a case where a total number of subcarriers N=32 and the guard band (equally distributed on two ends of the band) size may be 16 subcarriers. According to embodiments, in order to generate two repetitions, any of subband 1 (e.g., subcarrier indices −4 to 3) or subband 2 (e.g., subcarrier indices −8 to −5 and 4 to 7) may be used.

Zero Power (ZP) CSI-RS for Interference Measurement

According to embodiments, a sub-time unit DFT-s-OFDM CSI RS process may be used for interference measurement. According to embodiments, the interference measurement opportunities may become available between arbitrarily selected sub-time units.

Figure 21:
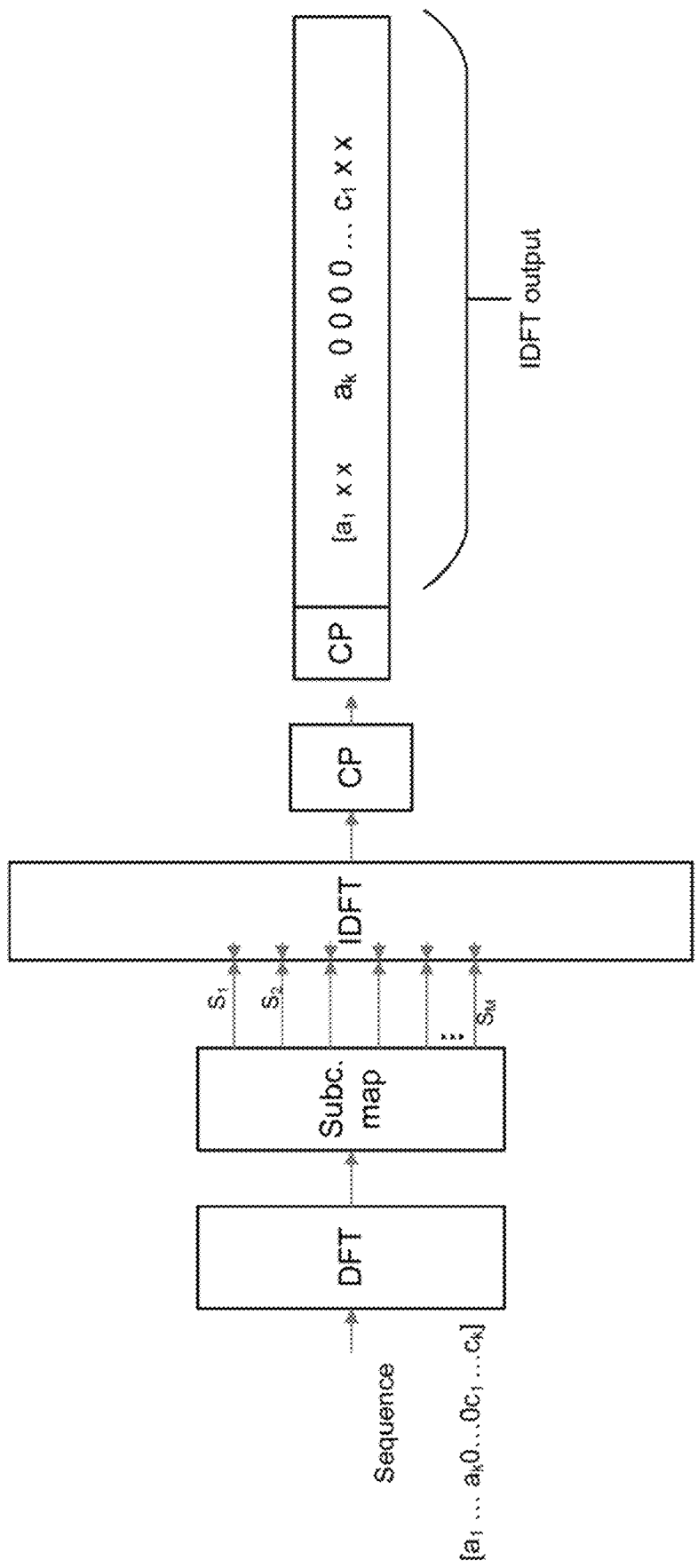
FIG. 21 is a diagram illustrating zero power (ZP) CSI-RS according to embodiments.

FIG. 21 is a diagram illustrating zero power (ZP) CSI-RS according to embodiments. According to embodiments, as illustrated in FIG. 21, an input vector to the DFT block may be portioned to multiple segments by a vector of zeros. According to embodiments, the zero segments may result in (e.g., generate, create) silence time between non-ZP CSI-RSs that may be used for interference measurements and/or opposite direction beam measurements.

According to embodiments, the measured interference on such events may be used for a number of different purposes. For example, according to embodiments, the measured interference on such instances may be utilized for fast adjustment of a beam prior to the next CSI-RS transmission. As another example, according to embodiments, the availability of sub-TU zero power transmissions allows for a fast ping-pong beam pairing process. For example, for the fast ping-pong beam pairing process, each side may enter (e.g., go to) a silence period (e.g., respectively after their own transmission) while waiting for the other side's transmission and (e.g., upon receiving the other side's transmission) each side may (e.g., then) perform a measurement on a beam received with the other side's transmission.

Figure 22:
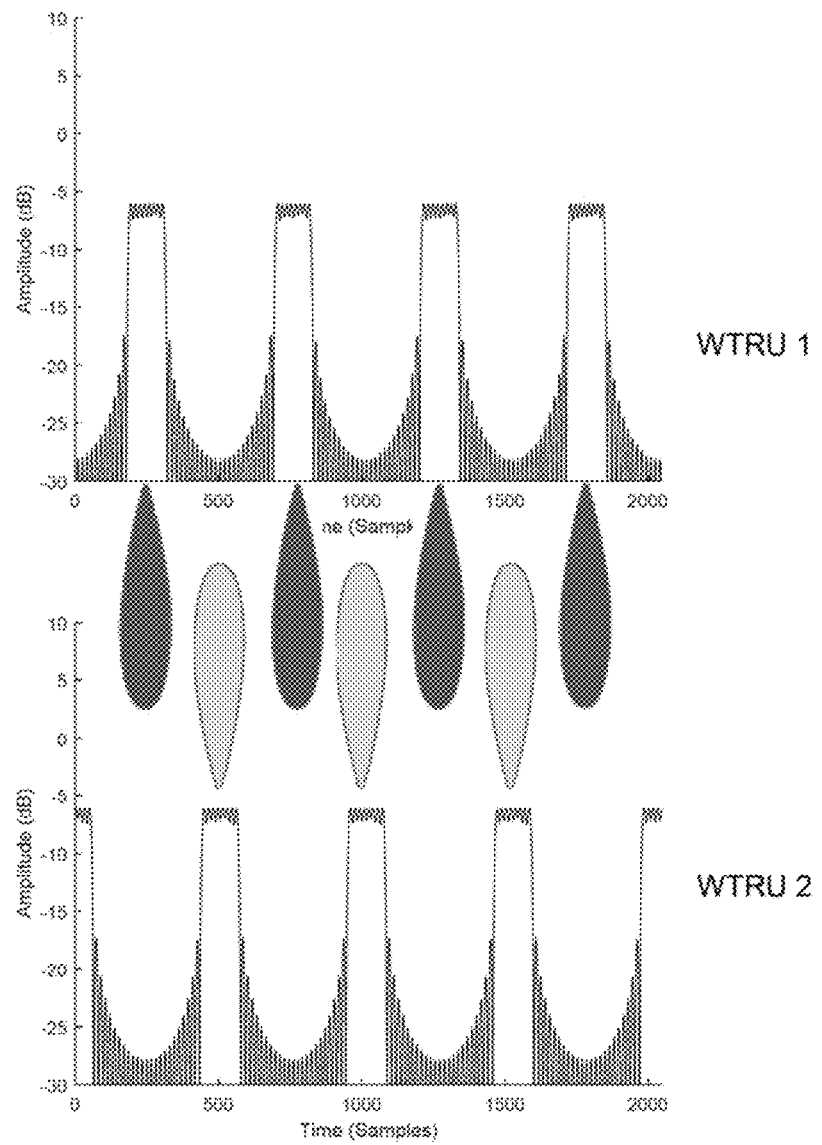
FIG. 22 is a diagram illustrating arrangement of ZP CSI-RSs according to embodiments.

FIG. 22 is a diagram illustrating an arrangement of ZP CSI-RSs according to embodiments. Referring to FIG. 22, the illustrated arrangement shows two TRWUs. According to embodiments, in such an arrangement, each side (e.g., each transmit/receive unit) may have an (e.g., immediate) opportunity for reference signal (e.g., CSI-RS) measurement on the other unit after its own CSI-RS measurements.

Sub-Unit CSI-RS Generation with DFT-s-OFDM and Multiple DFT Blocks

Figure 23:
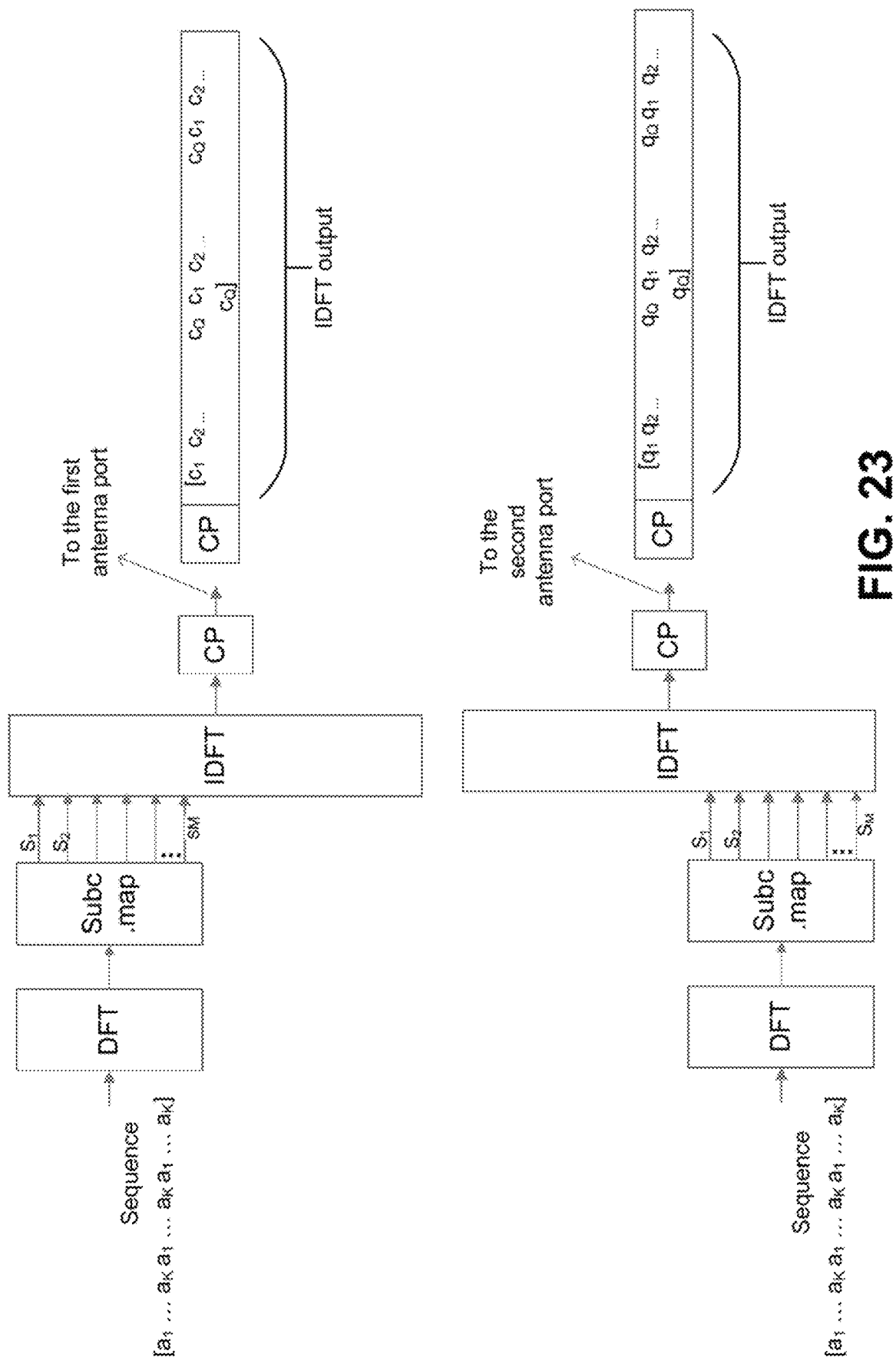
FIG. 23 is a diagram illustrating sub-unit CSI-RS generation with DFT-s-OFDM and multiple DFT blocks according to embodiments.

FIG. 23 is diagram illustrating sub-unit CSI-RS generation with DFT-s-OFDM and multiple DFT blocks according to embodiments. According to embodiments, in a case where a transmitter has multiple antenna ports, multiple reference signals (e.g., CSI-RSs, SRSs, etc.) may be generated from multiple sequences by mapping the multiple sequences to different subbands. For example, as shown in FIG. 23, two sequences may be used for respectively generating two reference signals that are mapped (e.g., fed, provided, etc.) to respective subbands that are associated with respective antenna ports. According to embodiments, in a case of generating multiple reference signals as shown in FIG. 23, the two subbands may be selected such that their respective output signals have repetitive structures. According to embodiments, these respective output signals may overlap in the time domain while being separated in the frequency domain.

According to embodiments, the generating (e.g., use) of multiple reference signals allows for (e.g., simultaneous) beam management, and may allow for the multiple reference signals to be transmitted on different subbands at different times. According to embodiments, a subband used for transmitting reference signals (e.g., CSI-RSs, SRSs, etc.) may change in time. For example, according to embodiments, the subband may change in time according to time granularities, such as OFDM signal, multiple of OFDM signals, a slot, a subframe, a transmission time interval (TTI), or any other similar and/or suitable time granularity (e.g., time period). According to embodiments, information associated with a subband (e.g., information indicating indices of a subcarrier in a subband, etc.) may be (e.g., has to be) communicated to a receiver. For example, the information associated with a subband may be signaled semi-statically, and/or may be signaled/indicated using a control channel. According to embodiments, a subband may be selected from among a pool of subbands and an index of the subband may be (e.g., implicitly) signaled. For example, the subband index may be computed by using any of (e.g., existing) parameters such as an OFDM symbol number, a subframe number, a cell ID, etc.

Sub-Unit CSI-RS Generation with IDFT Using Multiple Sub-Bands

According to embodiments, a set of interleaved subcarriers may be used to generate any number of signals. For example, a set of interleaved subcarriers may be used to generate any number of signals transmitted from any number of antenna ports. According to embodiments, any number of signals may have any number of sub-time units. For example, multiple signals with sub-time units may be generated by loading a set of interleaved subcarriers of non-overlapping sub-bands, wherein the multiple signals (e.g., each of the multiple signals) are generated according to the non-overlapping sub-bands.

According to embodiments, any number of bandwidth parts (e.g., a sub-band, a sub-carrier, a narrowband, a wideband, a local frequency band, or any other part of a frequency band, etc.) may be used for multiplexing any number of transmit beams. According to embodiments, a bandwidth part (e.g., each bandwidth part) may be associated with a transmit beam. According to embodiments, a sub-band may be interchangeably used with any of a narrowband, a bandwidth part, or a local frequency band.

According to embodiments, a transmit beam (e.g., a beam index identifying a transmit beam) may be associated with a sub-band. For example, a WTRU may determine a transmit beam (e.g., determine a beam identity) according to any of a sub-band or a sub-band beam index. According to embodiments, a number (e.g., a quantity) of sub-bands may be indicated, signaled, configured, etc. According to embodiments, a number of sub-bands may be used to implicitly determine a number of transmit beams used within an OFDM symbol. According to embodiments, a signal may be associated with a beam within a sub-band. For example, within a sub-band, a CSI-RS may be associated with a beam and may be transmitted in a set of interleaved subcarriers. According to embodiments, a CSI-RS associated with a beam may be referred to as a CSI-RS resource. According to embodiments, configuration parameters of a CSI-RS may include any of: a sub-band index, a bandwidth part index, a set of interleaved subcarriers within an associated sub-band, a number of antenna ports, a periodicity, a relative transmission power, or a slot offset.

Figure 24:
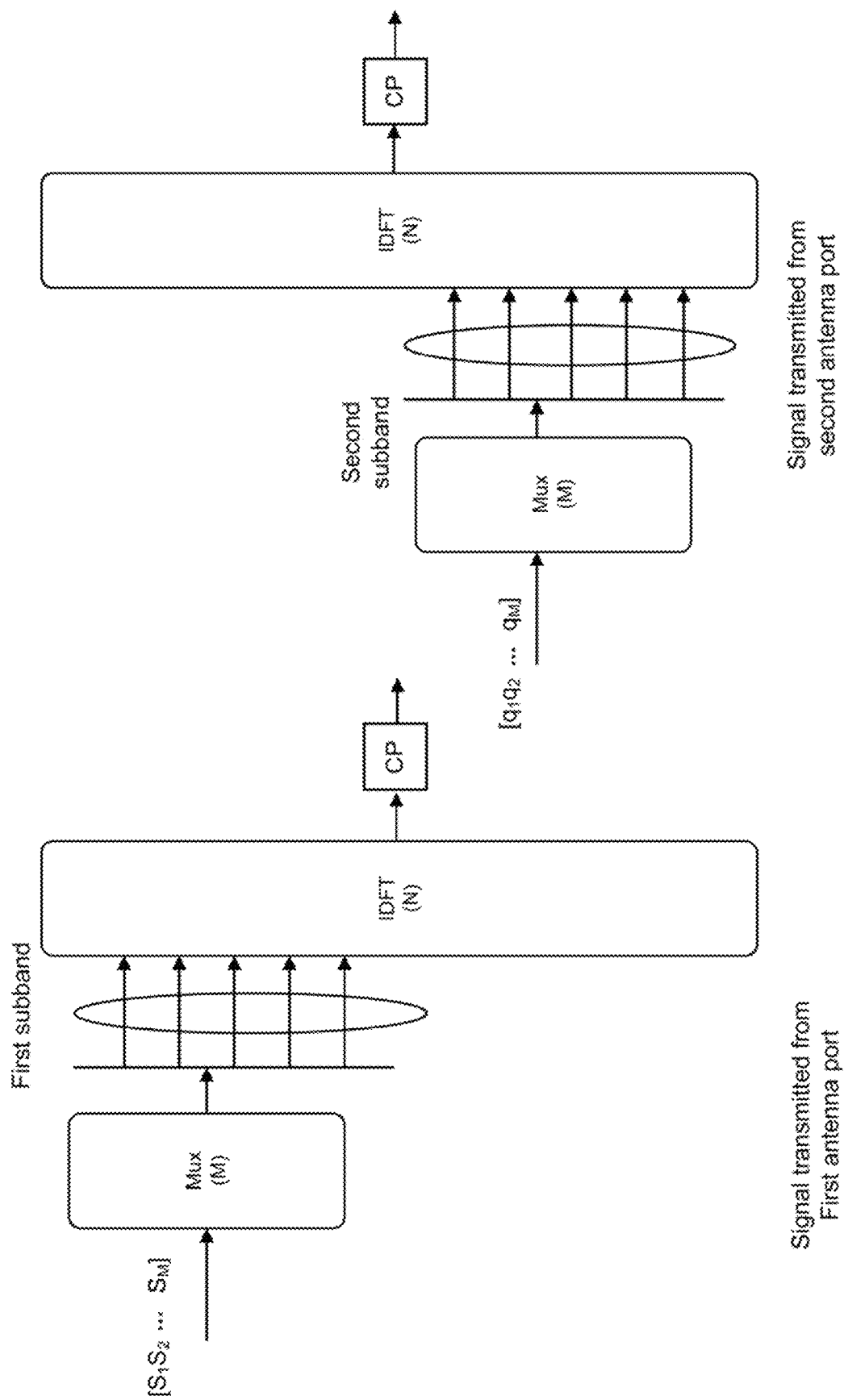
FIG. 24 is a diagram illustrating generating an OFDM transmission with sub-time units using multiple antenna ports according to embodiments.

FIG. 24 is a diagram illustrating generating an OFDM transmission with sub-time units using multiple antenna ports.

Referring to FIG. 24, a case of transmitting a signal having two sub-bands is shown. According to embodiments, a first sequence 2401 may be mapped to a set of interleaved subcarriers belonging to a first sub-band. According to embodiments, a multiplexer 2402 may be used to map the first sequence 2401 to a set of interleaved subcarriers belonging to a first sub-band of the bandwidth. For example, there may be a case where the first sub-band may include subcarriers [−8 through 7]. In such a case, a signal with two sub-time units may be generated by loading the subcarriers [−8, −6, −4, −2, 0, 2, 4, 6] with the elements of the first sequence. In the same case, a signal with four sub-time units may be generated by loading the subcarriers [−16, −12, 8, 12] with the elements of the first sequence.

According to embodiments, a second sequence 2403 may be mapped to a set of interleaved subcarriers within a second sub-band of the bandwidth. For example, there may be a case where the second sub-band includes the subcarriers [−16 to −9] and [8 to 15]. In such a case, a signal with 2 sub-time units may be generated by loading the subcarriers [−16, −14, −12, −10, 8, 10, 12, 14] with the elements of the first sequence. Further, a signal with 4 sub-time units may be generated by loading the subcarriers [−16, −12, 8, 12] with the elements of the first sequence. According to embodiments, each of the signals may be transmitted from a separate antenna port.

According to embodiments, information indicating a subcarrier index (e.g., within a sub-band) may be signaled (e.g., conveyed, configured, etc.) to a WTRU. According to embodiments, any of a number of sub-bands or indices of subcarriers within the sub-band may be configured by a network. According to embodiments, any of a reference sub-band or indices of subcarriers within the reference sub-band may be configured by the network. According to embodiments, a second sub-band may be configured according to a distance between of any one of a first, a center, or a last subcarrier of the second sub-band and any one of its first, center, or last subcarrier of the reference sub-band. According to embodiments, a repetition factor (e.g. a number of sub-time units within an OFDM symbol) may be configured by a network. According to embodiments a repetition factor may be used to determine the number of subcarriers within a sub-band (e.g., the number of subcarriers loaded onto a sub-band). According to embodiments, in the case of using a repetition factor, one of (e.g. every) L subcarriers may be loaded, for example, wherein L is the repetition factor and the first subcarrier to load may be the first subcarrier of the sub-band. According to embodiments, any number of sub-band may have the same (or a different) repetition factor.

Sub-Unit CSI-RS Generation with DFT-s-OFDM and Using FDM

Figure 25:
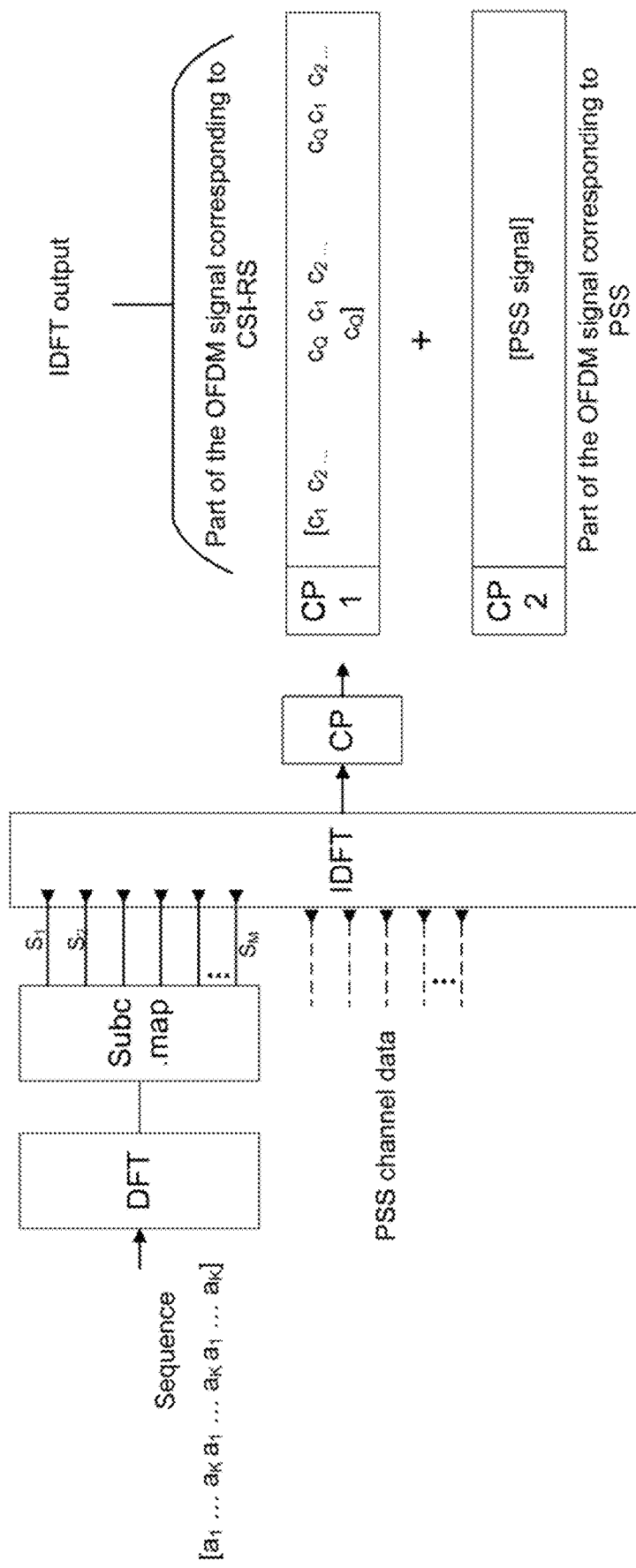
FIG. 25 is a diagram illustrating frequency division multiplexing (FDM) of CSI-RS and primary synchronization signal (PSS) according to embodiments.

FIG. 25 is a diagram illustrating frequency division multiplexing (FDM) of CSI-RS and a primary synchronization signal (PSS) according to embodiments. According to embodiments, there may be a case where a reference signal (e.g., CSI-RS, SRS) may (e.g., need to) be transmitted with another type of data (e.g., PSS channel data) in the same OFDM symbol. According to embodiments, the reference signal and the other type of data may be mapped to different subcarriers (e.g., may be separated by frequency division multiplexing (FDM)) and a repetitive reference signal may be (e.g., still) generated. According to embodiments, and as shown in FIG. 25, the reference signal and the other type of data may be mapped to non-overlapping subcarriers. In a case where the subcarriers having (e.g., loaded with) the reference signals are (e.g., properly, appropriately, etc.) selected, then the OFDM signal corresponding to the reference signal may have repeating sub-time units.

According to embodiments, the two parts (e.g., a reference signal part and another type of data part) may be included in a composite OFDM signal. For example, the composite OFDM signal may be a superposition of the two parts. According to embodiments, since the reference signal and the PSS are mapped to different subcarriers, beam selection may (e.g., still) be possible. According to embodiments, in the case of the reference signal and the PSS being mapped to different subcarriers, switching of transmit beams within an OFDM symbol may result in parts of the PSS signal being transmitted on different beams. In such a case, a receiver may (e.g., still) switch receive beams within an OFDM symbol if the receiver is not receiving the PSS. According to embodiments, in a case where wide beams are used, beams may be switched within an OFDM symbol, which may (e.g., also help) increase diversity for the PSS channel. According to embodiments, in the case where wide beams are used, it may be assumed that the CSI-RS and PSS are transmitted on the same antenna port. In the case where the reference signal and the PSS are transmitted on different antenna ports, beam training using the CSI-RS may (e.g., would, should) not impact the PSS transmission.

Sounding Reference Signal (SRS) Transmission

According to embodiments a SRS may be generated (e.g., for transmission) in a same and/or similar manner to that of a CSI-RS generated as described above. According to embodiments, a SRS may be generated using Property 1 (e.g., as expressed in Equation 4). For example, a DFT precoded IDFT SRS generator of a transmitter may generate a SRS in a same and/or similar manner as the DFT precoded IDFT CSI-RS generator of a transmitter shown in FIG. 8. Akin to a DFT precoded IDFT CSI RS generator, a DFT precoded SRS generator may generate DFT precoded reference signal on a block-by-block basis, where, for each block (set) of reference signals ("reference-signal block") processed through the DFT precoded IDFT CSI-RS generator, a corresponding DFT precoded reference signal results. The DFT precoded IDFT CSI-RS generator may include a DFT unit, a subcarrier mapping unit and an inverse DFT (IDFT) unit.

Figure 26:
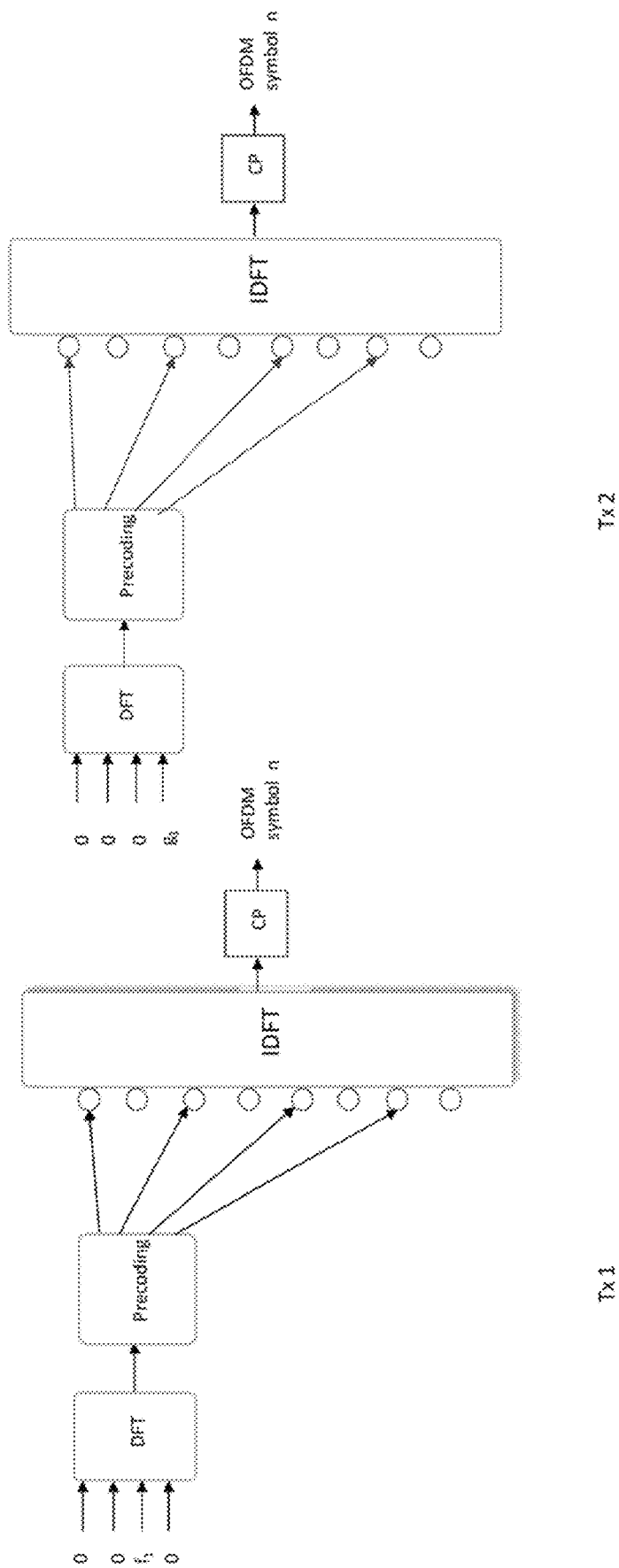
FIG. 26 is a diagram illustrating a DFT precoded IDFT SRS generator of a transmitter according to embodiments.

FIG. 26 is a diagram illustrating a DFT precoded IDFT SRS generator of a transmitter according to embodiments.

According to embodiments, the transmitter illustrated in FIG. 26 may be an alternative (e.g., but equivalent) representation of the transmitter illustrated in FIG. 8. For SRS transmission, there may be a case where one reference signal should (e.g., needs to) be transmitted from each of a plurality of antenna ports. In such a case, as a number of antenna ports transmitting the one reference signal increases, overhead for transmitting the SRS from each of the antenna ports may increase. According to embodiments, SRS overhead transmission may be reduced by using DFT precoding as illustrated in FIG. 26. Referring to FIG. 26, two antenna ports Tx1 and Tx2 are illustrated. However, the present disclosure is not limited thereto, and any number of antenna ports may be used when performing SRS transmission using DFT precoding according to embodiments discussed herein.

According to embodiments, inputs to the DFT blocks may be selected (e.g., chosen) such that for an $i^{th}$ input to the one or more DFT blocks, only one of the DFT blocks has a non-zero input value. For example, for a first input, the symbols that are fed to the DFT blocks in the two antenna ports Tx1 and Tx2 may be $[d_1\ 0]$, where d1 is fed into a first antenna port Tx1 and 0 (zero) is fed into a second antenna port Tx2. According to embodiments, for any number of antenna ports M, an $i^{th}$ input to the DFT blocks may have one non-zero value and M−1 zeros.

According to embodiments, an output of the DFT blocks may be precoded. For example, after a DFT operation is performed on the inputs by the DFT blocks, a result of the DFT operation may be precoded. According to embodiments, the output of the DFT blocks may be fed to a subcarrier mapping unit (which may be referred to as a precoder). For example, precoding (e.g., a precoding operation performed on the output of the DFT blocks) may include multiplying a DFT result (e.g., output) by a complex number, for example, to shift a phase, e.g., a phase of the DFT result. According to embodiments, any one or more of the DFT blocks may be mapped to (e.g., associated with) any one or more same subcarriers. According to embodiments, the subcarriers may be any of contiguous, interleaved, or a combination thereof. According to embodiments, FIG. 26 illustrates interleaved subcarriers.

According to embodiments, the same subcarriers and the same OFDM symbols may be used for the transmission of SRS from multiple antenna ports. For example, one or more subcarriers of an OFDM symbol may be mapped to one or more antenna ports for SRS transmission. Further, since the non-zero symbols of two sequences input to the DFT blocks do not overlap (e.g., mapped to respective antenna ports), a receiver may separate SRSs of one or more antenna ports and may measure a channel from the one or more antenna ports.

Figure 27:
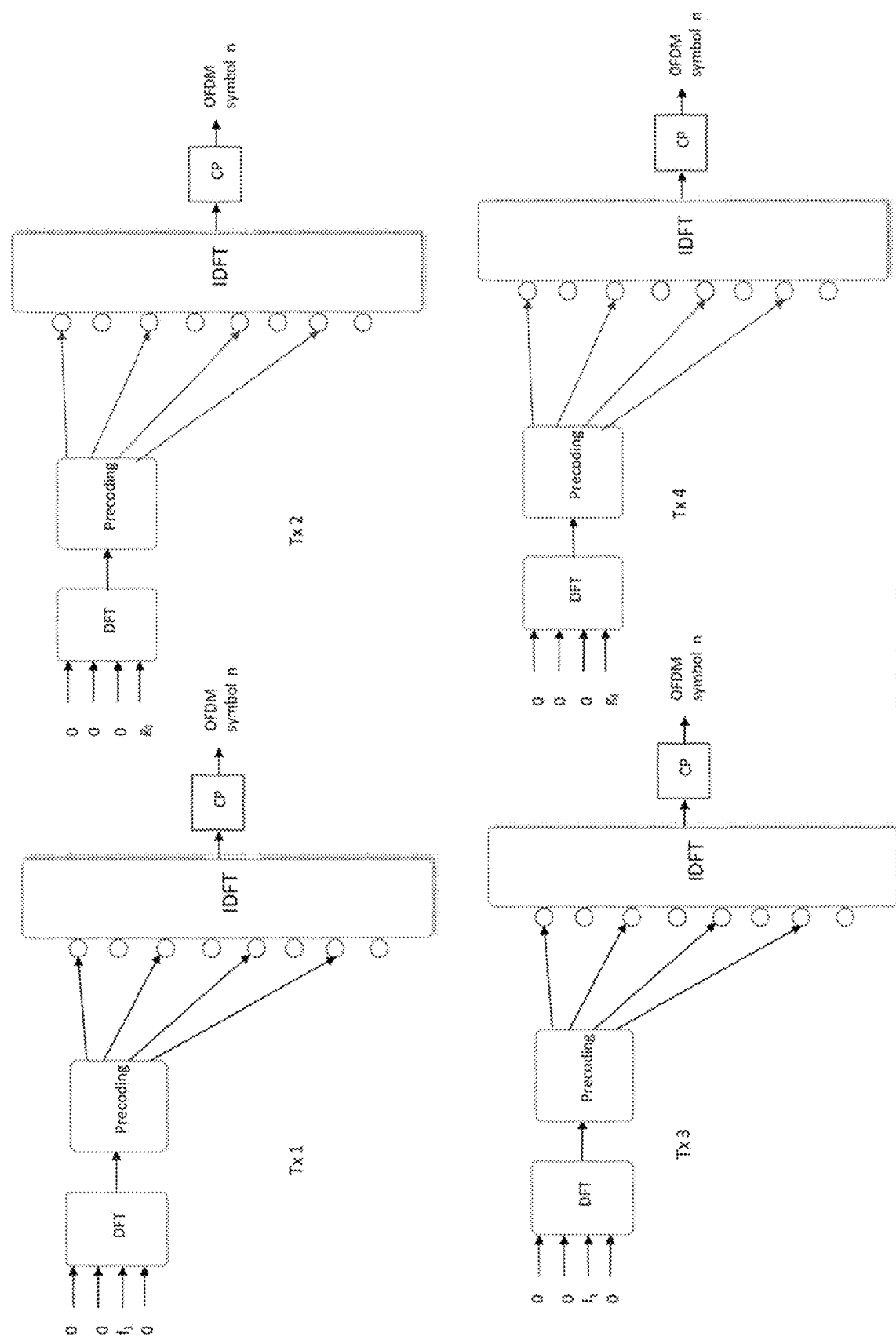
FIG. 27 is a diagram illustrating a DFT precoded IDFT SRS generator of a transmitter according to embodiments.

FIG. 27 is a diagram illustrating a DFT precoded IDFT SRS generator of a transmitter according to embodiments. According to embodiments, the transmitter illustrated in FIG. 27 may be an alternative (e.g., but equivalent) representation of the transmitter illustrated in FIG. 8.

Referring to FIG. 27, a DFT precoded IDFT SRS generator is shown as configured to generate a SRS transmission corresponding to four antenna ports. However, the present disclosure is not limited thereto, and a DFT precoded IDFT SRS generator may generate SRS transmission corresponding to any number of antenna ports. According to embodiments, non-zero values of a signal may be input into the DFT blocks according to antenna ports in a manner that the non-zero values do not overlap. For example, the non-zero values do not overlap in the manner of related/conventional art SRS waveform generators.

Resource Specific Low PAPR SRS Transmission

According to embodiments, a SRS may be generated according to resource specific sequences. For example, a resource specific sequence may be used as an input signal for generating a SRS. According to embodiments, a SRS sequence used to sound a frequency band (e.g., one or more subcarriers corresponding to the SRS sequence) may be a function of an index of any of one or more subcarriers or one or more resource blocks corresponding to the frequency band, for example. According to embodiments, the SRS sequence may be a function of one or more parameters, including an index.

Figure 28:
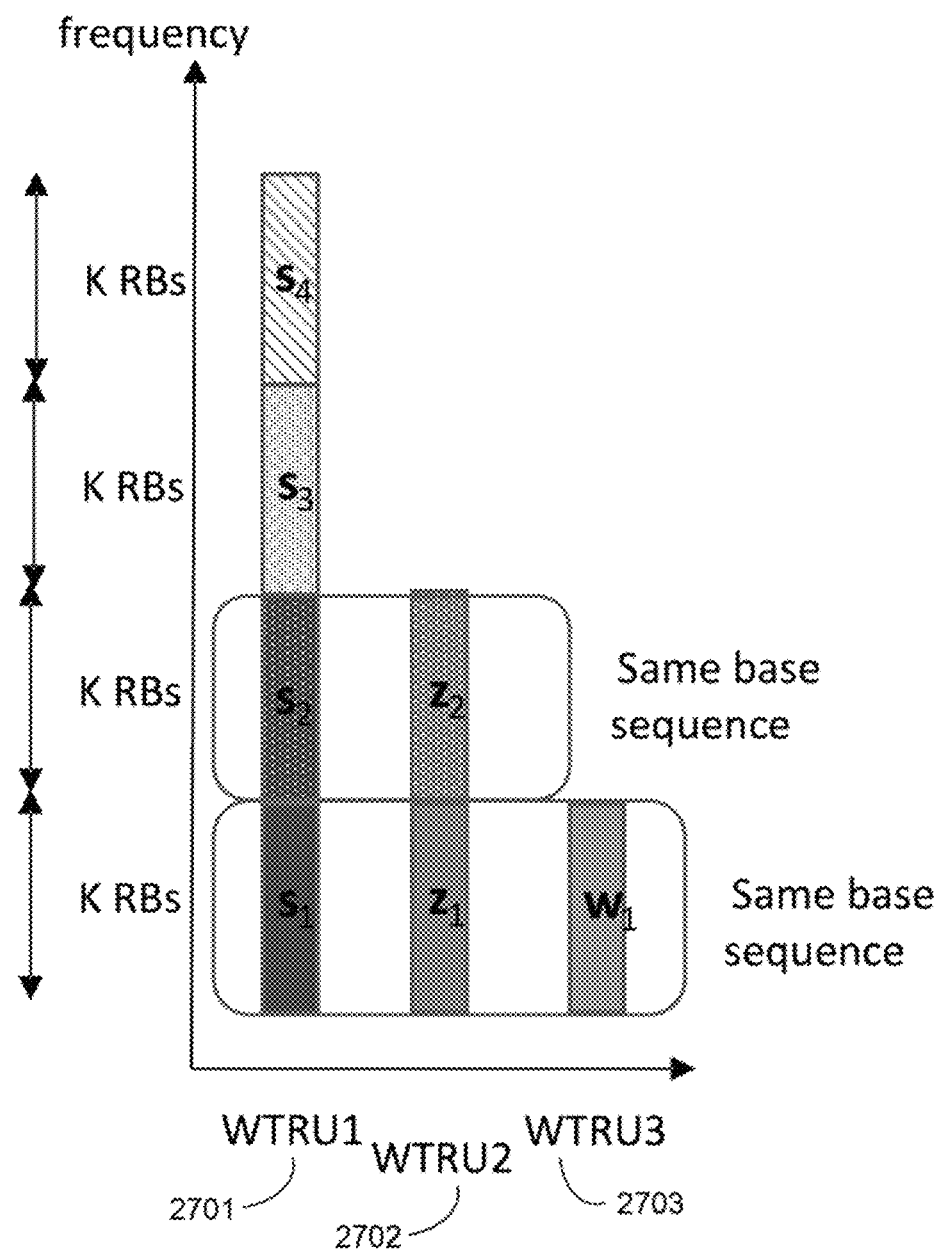
FIG. 28 is a diagram illustrating SRS transmission according to embodiments.

FIG. 28 is a diagram illustrating SRS transmission according to embodiments. According to embodiments, the SRS transmission show in FIG. 28 may be transmitted by a transmitter or equivalent representation of the transmitter illustrated in FIG. 8.

According to embodiments, a SRS transmission may be generated by and/or include one or more DFT precoded IDFT SRS generators corresponding to one or more WTRUs. For example, as illustrated in FIG. 28, a SRS transmission may include WTRUs 2801, 2802, and 2803, each having a transmitter including a DFT precoded IDFT SRS generator. According to embodiments, a first WTRU 2801 may use (e.g., 4) sequences $s_1$, $s_2$, $s_3$ and $s_4$ (e.g., as an input signal for SRS transmission), where each sequence is mapped to K resource blocks. According to embodiments, a second WTRU 2802 may use (e.g., two) sequences $z_1$ and $z_2$ while a third WTRU 2803 uses (e.g., one) sequence $w_1$.

According to embodiments, a sequence (e.g., any of the sequences used by WTRUs 2801 to 2803) may be may be designed (e.g., configured) such that the sequences mapped to the same frequency resources by different WTRUs may provide full or partial orthogonality (e.g., with respect to each other and/or corresponding signal transmissions). For example, in a case where sequences $s_1$, $z_1$, $w_1$ are used to sound the same subcarriers by different UEs, according to embodiments, the sequences may be derived from the same Zadoff Chu base sequence but with different cyclic shifts. According to embodiments, the cyclic shift applied may be different for each WTRU or may be the same for one or more WTRUs.

There may be a case where a peak to average power ration (PAPR) of a signal generated by the IDFT waveform generator is high. According to embodiments, a PAPR of a signal generated by a DFT precoded IDFT SRS generator may be reduced by multiplying a sequence (e.g., each sequence, each/any of the sequences used by WTRUs 2801 to 2803) with a complex number before mapping to a subcarrier (e.g., to respective subcarriers). For example, a DFT precoded IDFT SRS generator, e.g., included in any of WTRUs 2801 to 2803 may use the sequences $a_1 s_1$, $a_2 s_2$, $a_3 s_3$ and $a_4 s_4$, where $a_1$, $a_2$, $a_3$ and $a_4$ may be complex numbers chosen such that the SRS signal after the IDFT has low PAPR. According to embodiments, the complex numbers may have unity magnitude, i.e., they may be used to shift the phase only.

According to embodiments, a complex number (e.g., that is multiplied with the sequence) may be resource specific. According to embodiments, a complex number may be defined (e.g., configured, associated, etc.) for a set of any of subcarriers or RBs. For example, for RBs 0 to K−1, a base sequence $s_1$ and phase shift coefficient $a_1$ may be used. That is, a complex number consisting of the base sequence $s_1$ and the phase shift coefficient $a_1$ may be defined for (e.g., associated with) RBs 0 to K−1. According to embodiments, phase shift values may be a function of the number of sequences used. For example, for a WTRU, in a case where 4,000 RBs are sounded, then $a_1s_1$, $a_2s_2$, $a_3s_3$ and $a_4s_4$ may result in a lowest PAPR; and in a case were 3,000 RBs are sounded, $b_1s_1$, $b_2s_2$, $b_3s_3$ may result in the lowest PAPR; where $a_i$ may not be equal to $b_i$.

According to embodiments, phase shift values may be different for different WTRUs. In other words, the phase shift values for different UEs may not be equal to each other. According to embodiments, the phase shift values may be determined (e.g., configured, chosen, etc.) according to an algorithm known (e.g., established, configured, signaled, etc.) both to the transmitter and the receiver. According to embodiments, phase shift values may be chosen according to any number of parameters. For example, phase shift values may be chosen according to any of the indices of the subcarriers, the base sequences, the cyclic shifts, etc. According to embodiments, in a case where phase shift values are chosen according to parameters, such as the indices of the subcarriers, a transmitter and a receiver may (e.g., implicitly) know (e.g., determine) these values. According to embodiments, phase shift values may be signaled and/or configured by a network (e.g., a base station). According to embodiments, phase shift values may be determined (e.g., configured, computed, etc.) by a WTRU and signaled to a network (e.g., a base station).

Figure 29:
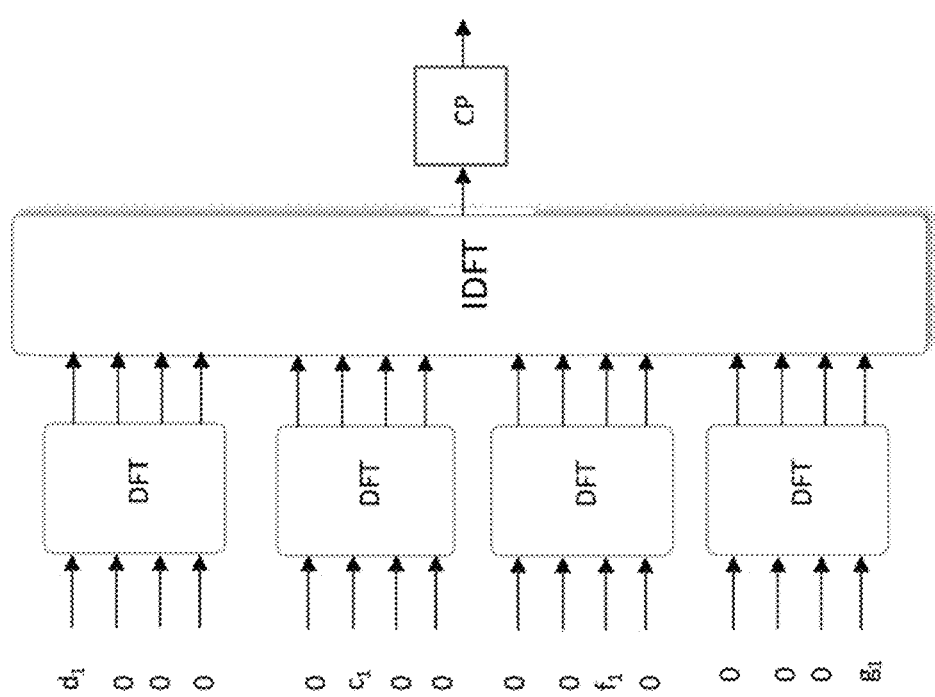
FIG. 29 is a diagram illustrating a DFT precoded IDFT SRS generator of a transmitter according to embodiments.
Figure 30:
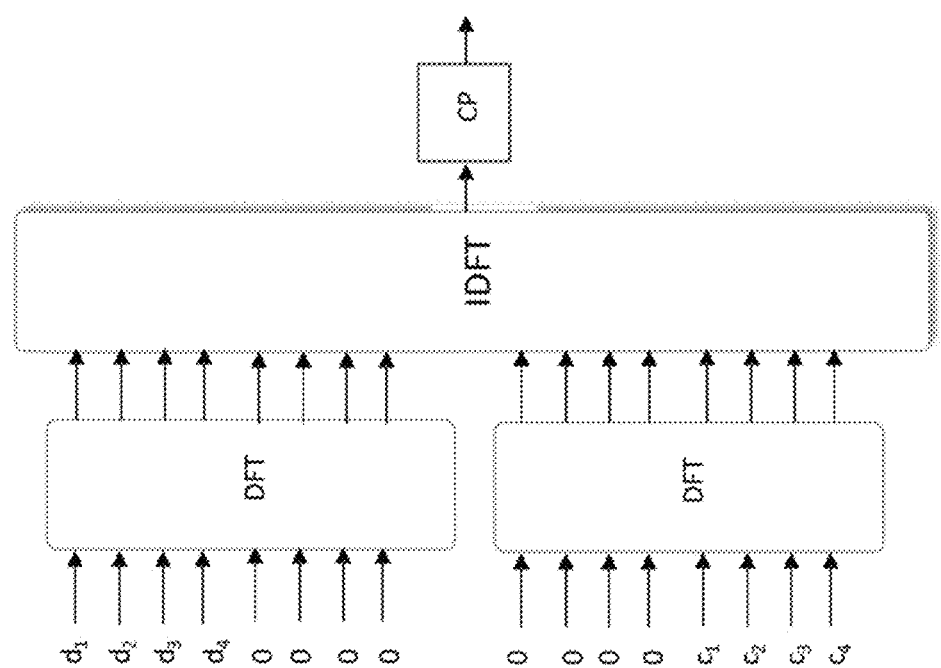
FIG. 30 is a diagram illustrating a DFT precoded IDFT SRS generator of a transmitter according to embodiments.

FIG. 29 is a diagram illustrating a DFT precoded IDFT SRS generator of a transmitter according to embodiments; and FIG. 30 is a diagram illustrating a DFT precoded IDFT SRS generator of a transmitter according to embodiments. According to embodiments, the transmitters illustrated in FIGS. 29 and 30 may be alternative (e.g., but equivalent) representation of the transmitter illustrated in FIG. 8.

According to embodiments, a PAPR of a signal generated by a DFT precoded IDFT SRS generator may be reduced by applying precoding to sequences used for SRS transmissions. In other words, SRS sequences may be designed (e.g., chosen, configured, etc.) using DFT precoding. According to embodiments, in a case where non-zero values of the DFT inputs do not overlap (e.g., FIGS. 29 and 30), a signal output by an IDFT (e.g., IDFT block) may have low PAPR. For example, in a case of not considering (e.g., ignoring) oversampling due to a larger size of an IDFT (e.g., IDFTs of the DFT precoded IDFT SRS generators 2900 and 3000), the time domain signal after the IDFT of the DFT precoded IDFT SRS generator 2900 may be $[d_1\ c_1\ f_1\ g_1]$, and the time domain signal after the IDFT of the DFT precoded IDFT SRS generator 3000 may be $[d_1\ d_2\ d_3\ d_4\ c_1\ c_2\ c_3\ c_4]$. According to embodiments, due to the mapping of the sequences to non-overlapping frequency bands, the time domain coefficients may be multiplied with a phase shift coefficient, while not increasing PAPR. According to embodiments, DFT outputs may be mapped to any of contiguous or interleaved subcarriers.

Figure 31:
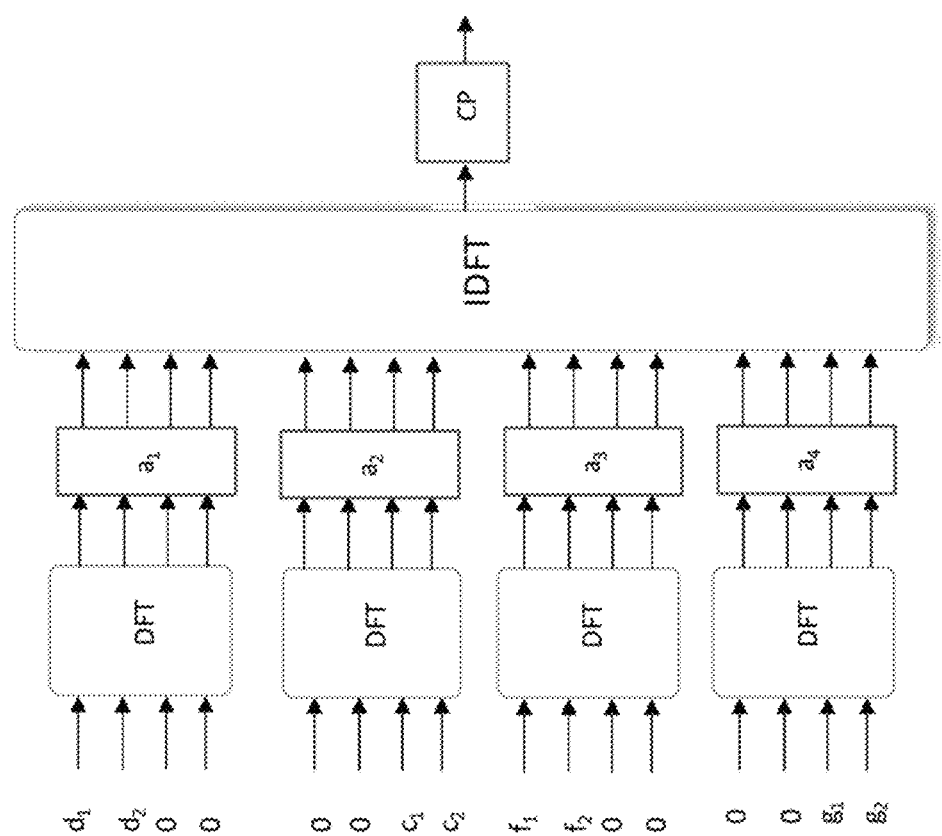
FIG. 31 is a diagram illustrating a DFT precoded IDFT SRS generator of a transmitter according to embodiments.

FIG. 31 is a diagram illustrating a DFT precoded IDFT SRS generator of a transmitter according to embodiments. According to embodiments, the transmitter illustrated in FIG. 31 may be an alternative (e.g., but equivalent) representation of the transmitter illustrated in FIG. 8.

There may be a case where the number of partial frequency bands is large, indices of the non-zero values of DFT inputs may overlap (e.g., may be allowed, configured, etc., to overlap), as shown in FIG. 30. In such a case, according to embodiments, DFT outputs (e.g., outputs of one or more DFT block) may be multiplied with complex numbers to control PAPR.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

REPRESENTATIVE EMBODIMENT

In a first representative embodiment, a representative method includes receiving information indicating any of at least first and second modes of operation for transmitting a discrete Fourier transform (DFT)-spread-orthogonal frequency division multiplexing (DFT-s-OFDM) symbol including a reference signal (RS); and transmitting the DFT-s-OFDM symbol including: (1) the RS and data tones, on condition that the information indicates the first mode; or (2) the RS and null tones, on condition that the information indicates the second mode, wherein the DFT-s-OFDM symbol is divided into a number of segments, each including a chunk of RS tones, and wherein any of a size or a location of the chunk is determined according to any of the first or second modes.

In a second representative embodiment, a representative device includes circuitry, including any of a processor, memory, a receiver, and a transmitter, configured to receive information indicating any of at least first and second modes of operation for transmitting a discrete Fourier transform (DFT)-spread-orthogonal frequency division multiplexing (DFT-s-OFDM) symbol including a reference signal (RS); and transmit the DFT-s-OFDM symbol including: (1) the RS and data tones, on condition that the information indicates the first mode; or (2) the RS and null tones, on condition that the information indicates the second mode, wherein the DFT-s-OFDM symbol is divided into a number of segments, each including a chunk of RS tones, and wherein any of a size or a location of the chunk is determined according to any of the first or second modes.

In a third representative embodiment, a representative method includes precoding, at a discrete Fourier transform (DFT) unit, a reference signal sequence padded with zeros to generate frequency domain samples; mapping, at a subcarrier mapping unit, (i) the frequency domain samples to a subset of equally spaced subcarriers of a set of available subcarriers, and (ii) null signals to remaining subcarriers of the set of available subcarriers, wherein the reference signal sequence includes reference signal tones and any of data tones or null tones, wherein the reference signal sequence is divided into a number of segments, and wherein each segment includes a chunk of reference signal tones; feeding the frequency domain samples and the null signals to an inverse discrete Fourier transform (IDFT) unit in accordance with the mapping; and transforming the frequency domain samples and the null signals received by the IDFT unit into a block based signal using an IDFT, wherein the block based signal includes a plurality of repetitions of the reference signal sequence for transmission during a single subframe, and wherein each repetition includes the padded zeros as a cyclic prefix.

In the first representative embodiment, all chunks including the PTRS in the DFT-s-OFDM symbol are transmitted using a same beam on condition that the information indicates the first mode, and different chunks including the PTRS in the DFT-s-OFDM symbol are transmitted using different beams on condition that the information indicates the second mode.

In the first representative embodiment, a same beam is used when a first beam measurement scheme is indicated and different beams are used when a second beam measurement scheme is indicated.

In the first representative embodiment, the RS tones comprises any of a phase tracking reference signal (PTRS) and a beam management reference signal, the reference signal tones are used for any of demodulation or signal measurement, and each segment comprises a reference signal tone and any of a data tone or a null tone.

In the first representative embodiment, the chunk size indicates a number of consecutive RS tones included in the chunk.

In the first representative embodiment, the method further includes determining a sequence for the reference signal tones according to any of: (1) UE specific parameters, or (2) associated beam information, and the UE specific parameters include any of: a UE-ID, a scrambling ID configured via a higher layer signaling, or a scheduling parameter.

In the first representative embodiment, the location of a chunk within a segment is any of: predetermined, configured, or determined according to a scheduling parameter of the data.

In the first representative embodiment, the method further includes determining the number of segments according to any of higher layer signaling, a UE capability, or a number of beams used, and determining the location of the chunk within a segment based on the location of a chunk for another DFT-s-OFDM symbol used for data transmission.

In the first representative embodiment, any of the first mode or the second mode of operation are applied to any of: a per symbol level, a slot level, or a TTI level, and the reference signal tones have a same transmission power, and the transmission power is determined according to any of the first or the second mode of operation.

In the first representative embodiment, the method further includes using the second mode of operation and determining the location of a chunk according to any of a UE specific parameter or a cell specific parameter, the UE specific parameter is any of a UE-ID, a C-RNTI, or a scrambling ID configured via a UE-specific higher layer signaling, and the cell specific parameter is a physical cell ID.

In the first representative embodiment, quasi-collocation (QCL) information is configured or indicated for all segments in a DFT-s-OFDM symbol on condition that the information indicates the first mode, and QCL information is configured or indicated for each segment on condition that the information indicates the second mode.

What is claimed is:

1. A method implemented in a wireless transmit/receive unit (WTRU) including a processor and a transceiver, the method comprising:
    receiving information indicating beam information associated with an orthogonal frequency division multiplexing (OFDM) symbol and a reference signal (RS);
    determining, for a plurality of sub-symbols included in the OFDM symbol, locations of a plurality of RS tones in the plurality of sub-symbols according to a WTRU identifier (ID) and a cell ID; and
    transmitting the OFDM symbol, which includes the plurality of sub-symbols, using a set of beams according to the beam information, wherein the plurality of RS tones of the RS and a plurality of null tones are included in the plurality of sub-symbols, and wherein the plurality of null tones segment the plurality of RS tones in the plurality of sub-symbols.

2. The method of claim 1,
    wherein each of the plurality of sub-symbols includes a set of two or more of the plurality of RS tones.

3. The method of claim 1,
    wherein the transmitting the OFDM symbol includes transmitting the plurality of RS tones in different ones of the plurality of sub-symbols of the OFDM symbol using different beams among the set of beams, and
    wherein each of the plurality of sub-symbols includes a set of two or more of the plurality of RS tones.

4. The method of claim 1, wherein the RS comprises any of a phase tracking reference signal (PTRS) and a beam management reference signal,
    wherein the RS tones are used for any of demodulation or signal measurement, and
    wherein each sub-symbol comprises a set of two or more of the plurality of RS tones and two or more of the plurality of null tones.

5. The method of claim 4, wherein the plurality of RS tones in at least one of the respective sub-symbols includes two or more consecutive RS tones included in the respective sub-symbol.

6. The method of claim 1, further comprising:
determining a sequence of the plurality of RS tones according to one or more WTRU-specific parameters,
wherein the one or more WTRU-specific parameters include any of: the WTRU ID, a scrambling ID configured via a higher layer signaling, or a scheduling parameter.

7. The method of claim 1, wherein a location of a set of one or more of the plurality of RS tones within one of the plurality of sub-symbols is any of: predetermined, configured, or determined according to a scheduling parameter.

8. The method of claim 1, further comprising:
determining a quantity of the plurality of sub-symbols according to any of higher layer signaling, a WTRU capability, and/or a number of the set of beams; and
determining a location of the plurality of RS tones within at least one of the sub-symbols based on another location of other RS tones within another symbol used for data transmission.

9. The method of claim 1, wherein the plurality of RS tones and the plurality of null tones are precoded using the beam information.

10. The method of claim 9, wherein the WTRU ID is a C-RNTI or a scrambling ID configured via WTRU-specific higher layer signaling, and
wherein the cell ID is a physical cell ID.

11. A wireless transmit/receive unit (WTRU) comprising:
a processor and a transceiver which are configured to:
receive information indicating beam information associated with an orthogonal frequency division multiplexing (OFDM) symbol and a reference signal (RS),
determine, for a plurality of sub-symbols included in the OFDM symbol, locations of a plurality of RS tones in the plurality of sub-symbols according to a WTRU identifier (ID) and a cell ID, and
transmit the OFDM symbol, which includes the plurality of sub-symbols, using a set of beams according to the beam information, wherein the plurality of RS tones of the RS and a plurality of null tones are included in the plurality of sub-symbols, and wherein the plurality of null tones segment the plurality of RS tones in the plurality of sub-symbols.

12. The WTRU of claim 11,
wherein each of the plurality of sub-symbols includes a set of two or more of the plurality of RS tones.

13. The WTRU of claim 11,
wherein the processor and the transceiver are configured to transmit the OFDM symbol which includes to transmit the plurality of RS tones in different ones of the plurality of sub-symbols of the OFDM symbol using different beams among the set of beams, and
wherein each of the plurality of sub-symbols includes a set of two or more of the plurality of RS tones.

14. The WTRU of claim 11, wherein the RS comprises any of a phase tracking reference signal (PTRS) and a beam management reference signal,
wherein the RS tones are used for any of demodulation or signal measurement, and
wherein each sub-symbol comprises a set of two or more of the plurality of RS tones and two or more of the plurality of null tones.

15. The WTRU of claim 14, wherein the plurality of RS tones in at least one of the respective sub-symbols includes two or more consecutive RS tones included in the respective sub-symbol.

16. The WTRU of claim 11, wherein the processor and the transceiver are configured to:
determine a sequence of the plurality of RS tones according to one or more WTRU-specific parameters,
wherein the one or more WTRU-specific parameters include any of: the WTRU ID, a scrambling ID configured via a higher layer signaling, or a scheduling parameter.

17. The WTRU of claim 11, wherein a location of a set of one or more of the plurality of RS tones within one of the plurality of sub-symbols is any of: predetermined, configured, or determined according to a scheduling parameter.

18. The WTRU of claim 11, wherein the processor and the transceiver are configured to:
determine a quantity of the plurality of sub-symbols according to any of higher layer signaling, a WTRU capability, and/or a number of the set of beams, and
determine a location of the plurality of RS tones within at least one of the sub-symbols based on another location of other RS tones within another symbol used for data transmission.

19. The WTRU of claim 11, wherein the plurality of RS tones and the plurality of null tones are precoded using the beam information.

20. The WTRU of claim 19,
wherein the WTRU ID is a C-RNTI, or a scrambling ID configured via WTRU-specific higher layer signaling, and
wherein the cell ID is a physical cell ID.

* * * * *